US 8,730,180 B2

(12) United States Patent
Kim

(10) Patent No.: US 8,730,180 B2
(45) Date of Patent: May 20, 2014

(54) CONTROL OF INPUT/OUTPUT THROUGH TOUCH

(75) Inventor: Bong Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 756 days.

(21) Appl. No.: 12/466,619

(22) Filed: May 15, 2009

(65) Prior Publication Data

US 2010/0137027 A1 Jun. 3, 2010

(30) Foreign Application Priority Data

Nov. 28, 2008 (KR) ........................ 10-2008-0119541

(51) Int. Cl.
*G06F 3/041* (2006.01)
(52) U.S. Cl.
USPC ........... 345/173; 345/156; 345/174; 715/700; 715/702; 715/705; 715/727
(58) Field of Classification Search
USPC .......................................... 345/173; 715/600
See application file for complete search history.

(56) References Cited

U.S. PATENT DOCUMENTS

| | | | |
|---|---|---|---|
| 6,349,225 B1 * | 2/2002 | Lands et al. ................ | 455/575.3 |
| 2003/0034439 A1 * | 2/2003 | Reime et al. .................. | 250/221 |
| 2005/0219228 A1 * | 10/2005 | Alameh et al. ................ | 345/173 |
| 2005/0250553 A1 * | 11/2005 | Lim ............................ | 455/569.1 |
| 2006/0161871 A1 * | 7/2006 | Hotelling et al. ............. | 715/863 |
| 2006/0167870 A1 | 7/2006 | Berthaud et al. | |
| 2006/0238517 A1 * | 10/2006 | King et al. ..................... | 345/173 |
| 2007/0116199 A1 * | 5/2007 | Arrasvuori et al. ............. | 379/68 |
| 2008/0055263 A1 | 3/2008 | Lemay et al. | |
| 2008/0055264 A1 * | 3/2008 | Anzures et al. ................ | 345/173 |
| 2008/0140868 A1 | 6/2008 | Kalayjian et al. | |
| 2009/0278806 A1 * | 11/2009 | Duarte et al. .................. | 345/173 |
| 2009/0319893 A1 * | 12/2009 | Pihlaja .......................... | 715/702 |

FOREIGN PATENT DOCUMENTS

| | | | |
|---|---|---|---|
| EP | 1860539 A1 | 11/2007 | |
| EP | 1953632 A2 | 8/2008 | |
| EP | 1965573 A2 | 9/2008 | |

* cited by examiner

*Primary Examiner* — Grant Sitta
(74) *Attorney, Agent, or Firm* — Birch, Stewart, Kolasch & Birch, LLP

(57) ABSTRACT

A mobile terminal including a speaker configured to output sound data, a microphone configured to receive voice data, a sensing unit configured to sense a touching operation of at least one of 1) the speaker or the microphone and 2) a neighborhood area of the speaker or the microphone, and a controller configured to control a volume of the speaker or the microphone based on the sensed touching operation of said at least one of 1) the speaker or the microphone and 2) the neighborhood area of the speaker or the microphone.

11 Claims, 17 Drawing Sheets

CONTROL OF INPUT/OUTPUT THROUGH TOUCH

CROSS-REFERENCE TO A RELATED APPLICATION

This application claims the benefit of Korean Patent Application No. 10-2008-0119541 filed on Nov. 28, 2008, which is incorporated herein by reference in its entirety.

BACKGROUND OF THE INVENTION

1. Field of the Invention

The present invention relates to a mobile terminal and corresponding for easily controlling functions related to input/output devices on the terminal such as a camera, microphone and a speaker.

2. Discussion of the Background

A recent terminal such as a personal computer, a notebook computer or a cellular phone has a variety of functions, and is constructed in the form of a multimedia player having various functions such as allowing users to photograph pictures or moving images, play music or moving image files, play games, receive broadcasting programs and so on.

The terminal also includes an input/output device for inputting and outputting data in order to perform the various functions. Further, the input/output device includes a plurality of input/output units for respectively inputting and outputting data such as audio data, video data and text data. However, the user has to perform a complicated key operation or menu operation in order to execute the various functions.

SUMMARY OF THE INVENTION

Accordingly, one object of the present invention is to address the above-noted and other problems.

Another object of the present invention is to provide a mobile terminal and corresponding method for controlling an input/output of information according to a touch operation in a convenient and intuitive manner.

To achieve these and other advantages and in accordance with the purpose of the present invention, as embodied and broadly described herein, the present invention provides in one aspect a mobile terminal including a speaker configured to output sound data, a microphone configured to receive voice data, a sensing unit configured to sense a touching operation of at least one of 1) the speaker or the microphone and 2) a neighborhood area of the speaker or the microphone, and a controller configured to control a volume of the speaker or the microphone based on the sensed touching operation of said at least one of 1) the speaker or the microphone and 2) the neighborhood area of the speaker or the microphone. The present invention also provides a corresponding method of controlling a mobile terminal.

In another aspect, the present invention provides a mobile terminal including a camera configured to capture image data, a sensing unit configured to sense a touching operation of at least one of the camera or a neighborhood area of the camera, and a controller configured to control an operation of the camera based on the sensed touching operation of the camera. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Hereinafter, a mobile terminal relating to embodiments of the present invention will be described below in more detail with reference to the accompanying drawings. Further, the mobile terminal described in the specification can include a cellular phone, a smart phone, a laptop computer, a digital broadcasting terminal, personal digital assistants (PDA), a portable multimedia player (PMP), a navigation system and so on.

Figure 1:
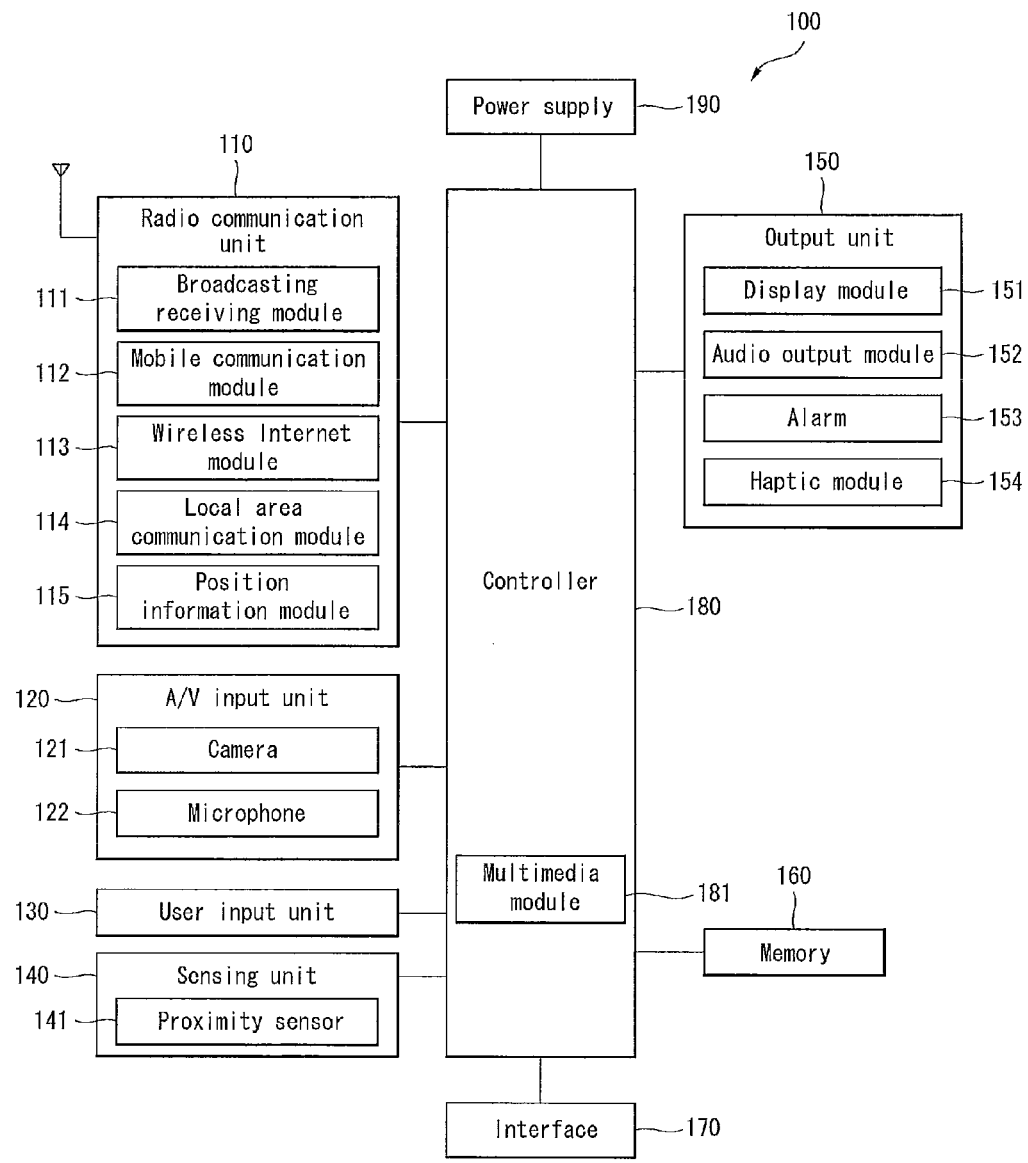
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 are essential parts and the number of components included in the mobile terminal can be varied.

In addition, the radio communication unit 110 includes at least one module that enables radio communication between the mobile terminal 100 and a radio communication system or between the mobile terminal 100 and a network in which the mobile terminal 100 is located. For example, in FIG. 1, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Further, the broadcasting channel can include a satellite channel and a terrestrial channel. Also, the broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals, but also signals in the form of a combination of a TV broadcasting signal and a radio broadcasting signal.

In addition, the broadcasting related information can be information on a broadcasting channel, a broadcasting program or a broadcasting service provider. The broadcasting related information can be provided even through a mobile communication network. In this instance, the broadcasting related information can be received by the mobile communication module 112. The broadcasting related information can also exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. In particular, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, and the DVB-H and integrated services digital broadcast-terrestrial (ISDB-T) system. The broadcasting receiving module 111 can also be constructed to be suited to broadcasting systems providing broadcasting signals other than the above-described digital broadcasting systems. The broadcasting signals and/or broadcasting related information received through the broadcasting receiving module 111 can also be stored in the memory 160.

Further, the mobile communication module 112 transmits/receives a radio signal to/from at least one of a base station, an external terminal, and a server on a mobile communication network. The radio signal can include a voice call signal, a video telephony call signal or data in various forms according to transmission and receiving of text/multimedia messages. The wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique. The local area communication module 114 corresponds to a module for local area communication. Bluetooth, radio frequency identification (RFID), infrared data association (IrDA), ultra wideband (UWB) and ZigBee can be used as a local area communication technique.

In addition, the position information module 115 confirms or obtains the position of the mobile terminal 100. A global positioning system (GPS) module is a representative example of the position information module 115. Further, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude coordinates at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. The processed image frames can be displayed on a display unit 151 included in the output unit 150. In addition, the image frames processed by the camera 121 can be stored in the memory 160 or transmitted to an external device through the radio communication unit 110. The mobile terminal 100 can also include at least two cameras according to constitution of the terminal.

Further, the microphone 122 receives an external audio signal in a call mode, a recording mode or a speed recognition mode and processes the received audio signal into electric audio data. The audio data can also be converted into a form that can be transmitted to a mobile communication base station through the mobile communication module 112 and output in the call mode. The microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on. The sensing unit 140 senses the current state of the mobile terminal 100, such as an open/close state of the mobile terminal 100, the position of the mobile terminal 100, whether a user touches the mobile terminal 100, the direction of the mobile terminal 100 and acceleration/deceleration of the mobile terminal 100 and generates a detection signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor 141.

In addition, the output unit 150 generates visual, auditory or tactile output and can include the display unit 151, an audio output module 152, an alarm 153 and a haptic module 154. The display unit 151 displays information processed by the mobile terminal 100. For example, the display unit 151 displays a UI or graphic user interface (GUI) related to a telephone call when the mobile terminal is in the call mode. The display unit 151 also displays a captured or/and received image, UI or GUI when the mobile terminal 100 is in the video telephony mode or the photographing mode.

The display unit 151 can also include at least one of a liquid crystal display, a thin film transistor liquid crystal display, an organic light-emitting diode display, a flexible display and a three-dimensional display. Some of these displays can be of a transparent type or a light transmission type, which is referred to as a transparent display. The transparent display also includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display unit 151.

Further, the mobile terminal 100 can include at least two display units 151 according to constitution of the terminal. For example, the mobile terminal 100 can include a plurality of displays that are arranged on a single face at a predetermined distance or integrated. Otherwise, the plurality of displays can be arranged on different sides. In addition, when the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

Also, the touch sensor can be constructed such that it converts a variation in pressure applied to a specific portion of the display unit 151 or a variation in capacitance generated at a specific portion of the display unit 151 into an electric input signal. The touch sensor can also be constructed such that it can sense pressure of touch as well as the position and area of touch. When touch input is applied to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal 100, surrounded by the touch screen, or near the touch screen. The proximity sensor 141 senses an object approaching a predetermined sensing face or an object located near the proximity sensor 141 using an electromagnetic force or infrared rays without having mechanical contact. Further, the proximity sensor 141 has a lifetime longer than that of a contact sensor and has wide application. The proximity sensor 141 also includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

In addition, a capacitive touch screen is constructed such that a proximity of a pointer is detected through a variation in an electric field according to the proximity of the pointer. In this instance, the touch screen (touch sensor) can be classified as a proximity sensor. For convenience of explanation, an action of approaching the pointer to the touch screen while the pointer is not in contact with the touch screen such that the location of the pointer on the touch screen is recognized is referred to as a "proximity touch" and an action of bringing the pointer into contact with the touch screen is referred to as a "contact touch" in the following description. Also, a proximity touch point of the pointer on the touch screen means a point of the touch screen to which the pointer corresponds perpendicularly to the touch screen when the pointer proximity-touches the touch screen.

Further, the proximity sensor 141 senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can also be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. The audio output module 152 also outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating a generation of an event of the mobile terminal 100. Examples of events generated in the mobile terminal 100 include receiving a call signal, receiving a message, inputting a key signal, inputting touch, etc. The alarm 153 can also output signals in forms different from video signals or audio signals, for example, a signal for indicating a generation of an event through vibration. The video signals or the audio signals can also be output through the display unit 151 or the audio output module 152.

In addition, the haptic module 154 generates various haptic effects that the user can feel. A representative example of the haptic effects is vibration. The intensity and pattern of vibration generated by the haptic module 154 can also be controlled. For example, different vibrations can be combined and output or sequentially output. The haptic module 154 can also generate a variety of haptic effects including an effect of stimulus according to an arrangement of pins vertically moving for a contact skin face, an effect of stimulus according to a jet force or sucking force of air through a jet hole or a sucking hole, an effect of stimulus of rubbing the skin, an effect of stimulus according to contact of an electrode, an effect of stimulus using an electrostatic force and an effect according to reproduction of cold and warmth using an element capable of absorbing or radiating heat in addition to vibrations. Further, the haptic module 154 can not only transmit haptic effects through direct contact but also allow the user to feel haptic effects through kinesthetic sense of his or her fingers or arms. The mobile terminal 100 can also include at least two or more haptic modules 154 according to constitution of the mobile terminal.

In addition, the memory 160 stores a program for the operation of the controller 180 and temporarily stores input/output data (for example, phone book, messages, still images, moving images, etc.). The memory 160 can also store data about vibrations and sounds in various patterns, which are output when a touch input is applied to the touch screen. The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

Further, the interface 170 serves as a path to all external devices connected to the mobile terminal 100. The interface 170 receives data or power from the external devices and transmits the data or power to the internal components of the mobile terminal 100 or transmits data of the mobile terminal 100 to the external devices. The interface 170 can also include a wired/wireless headset port, an external charger port, a wired/wireless data port, a memory card port, a port for connecting a device having a user identification module, an audio I/O port, a video I/O port, an earphone port, etc., for example.

In addition, an identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

Also, the interface 170 can serve as a path through which power from an external cradle is provided to the mobile terminal 100 when the mobile terminal 100 is connected to the external cradle or a path through which various command signals input by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. In FIG. 1, the controller 180 includes a multimedia module 181 for playing multimedia. The multimedia module 181 can be included in the controller 180 or separated from the controller 180. Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Further, various embodiments of the present invention can be implemented in a computer or similar device readable recording medium using software, hardware or a combination thereof, for example. According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. The embodiments can also be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
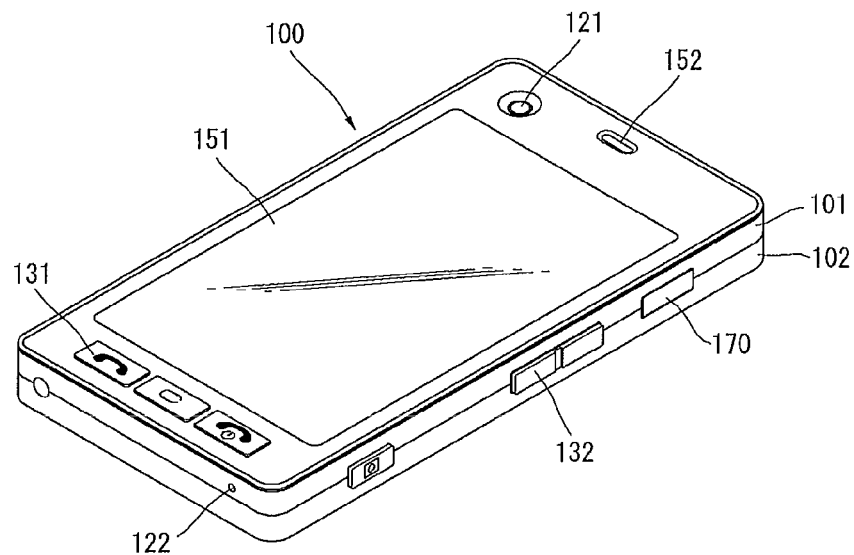
FIG. 2A is a front perspective view of a handheld terminal according to an embodiment of the present invention.

Next, FIG. 2A is a front perspective view of a mobile terminal or a handheld terminal 100 according to an embodiment of the present invention. As shown, the handheld terminal 100 has a bar type terminal body. However, the present invention is not limited to a bar type terminal and can be applied to terminals of various types including a slide type, folder type, swing type and swivel type terminals having at least two bodies that are relatively movably combined.

In addition, the terminal body includes a case (a casing, a housing, a cover, etc.) forming the exterior of the terminal 100. In the present embodiment, the case is divided into a front case 101 and a rear case 102. Various electronic components are also arranged in the space formed between the front case 101 and the rear case 102. At least one middle case can be additionally arranged between the front case 101 and the rear case 102. The cases can also be formed of plastics through injection molding or be made of a metal material such as stainless steel (STS) or titanium (Ti).

In addition, the display unit 151, the audio output unit 152, the camera 121, user input units 131 and 132 of the user input unit 130 (FIG. 1), the microphone 122 and the interface 170 are arranged in the terminal body, specifically, in the front case 101. Also, the display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. In addition, the user input unit 132 and the interface 170 are arranged on the sides of the front case 101 and the rear case 102.

Further, the user input unit 130 is operated to receive commands for controlling the operation of the handheld terminal 100 and can include the operating units 131 and 132. The operating units 131 and 132 can be referred to as manipulating portions and employ any tactile manner in which a user operates the operating units 131 and 132 while having tactile feeling. The operating units 131 and 132 can also receive various inputs. For example, the operating unit 131 receives commands such as start, end and scroll, and the second operating unit 132 receives commands such as control of the volume of sound output from the audio output unit 152 or conversion of the display unit 151 to a touch recognition mode.

Figure 2B:
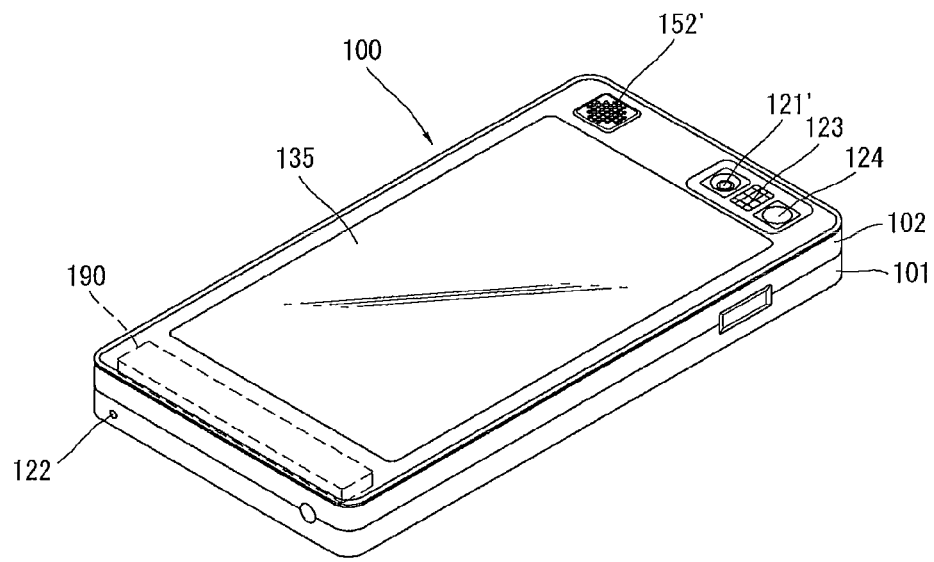
FIG. 2B is a rear perspective view of the handheld terminal according to an embodiment of the present invention.

Next, FIG. 2B is a rear perspective view of the handheld terminal shown in FIG. 2A according to an embodiment of the present invention. Referring to FIG. 2B, a camera 121' is additionally attached to the rear side of the terminal body, that is, the rear case 102. The camera 121' has a photographing direction opposite to that of the camera 121 shown in FIG. 2A and can have pixels different from those of the camera 121 shown in FIG. 2A. For example, it is preferable that the camera 121 has low pixels such that it can capture an image of the face of a user and transmit the image to a receiving part for video telephony, while the camera 121' has high pixels because it captures an image of a general object and does not immediately transmit the image in many instances. The cameras 121 and 121' can also be attached to the terminal body such that they can be rotated or pop-up.

A flash bulb 123 and a mirror 124 are also arranged in proximity to the camera 121'. The flash bulb 123 lights an object when the camera 121' takes a picture of the object, and the mirror 124 is used for the user to look at his/her face in the mirror when the user wants to self-photograph himself/herself using the camera 121'. An audio output unit 152' is also provided on the rear side of the terminal body. The audio output unit 152' can thus achieve a stereo function with the audio output unit 152 shown in FIG. 2A and be used for a speaker phone mode when the terminal is used for a telephone call.

A broadcasting signal receiving antenna 124 is also attached to the side of the terminal body in addition to an antenna for telephone calls. The antenna 124 constructing a part of the broadcasting receiving module 111 shown in FIG. 1 can be set in the terminal body such that the antenna 124 can be retracted from the terminal body. Further, the power supply 190 for providing power to the handheld terminal 100 is set in the terminal body. The power supply 190 can be included in the terminal body or detachably attached to the terminal body. A touch pad 135 for sensing touch is also attached to the rear case 102. The touch pad 135 can be of a light transmission type as the display unit 151. In this instance, if the display unit 151 outputs visual information through both sides thereof, the visual information can be recognized through the touch pad 135. The information output through both sides of the display unit 151 can also be controlled by the touch pad 135. Otherwise, a display is additionally attached to the touch pad 135 such that a touch screen can be arranged even in the rear case 102.

The touch pad 135 also operates in connection with the display unit 151 of the front case 101. The touch pad 135 can be located in parallel with the display unit 151 behind the display unit 151, and can be identical to or smaller than the display unit 151 in size. Interoperations of the display unit 151 and the touch pad 135 will now be described with reference to FIGS. 3A and 3B.

Figure 3A:
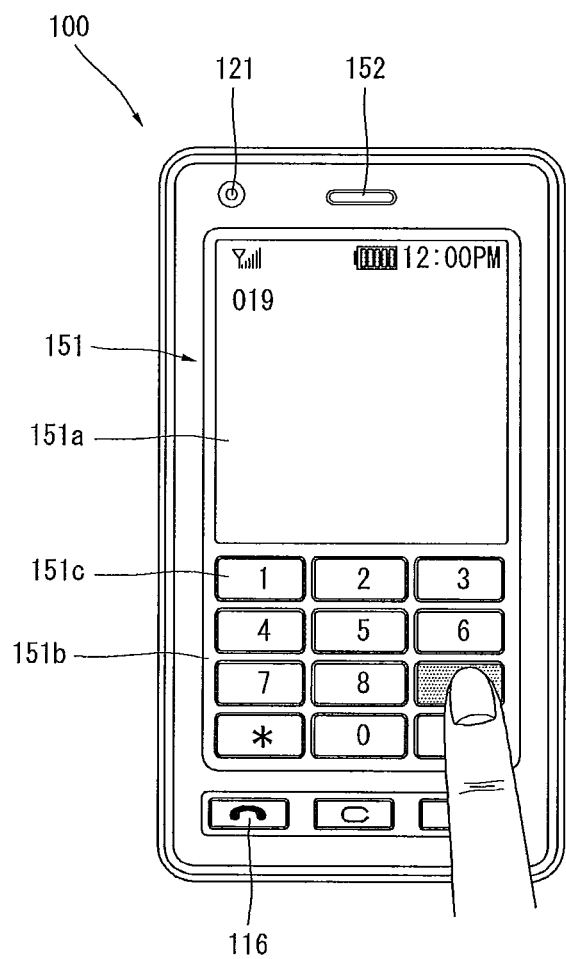
FIGS. 3A and 3B are front views of the handheld terminal for explaining an operation of the handheld terminal according to an embodiment of the present invention.
Figure 3B:
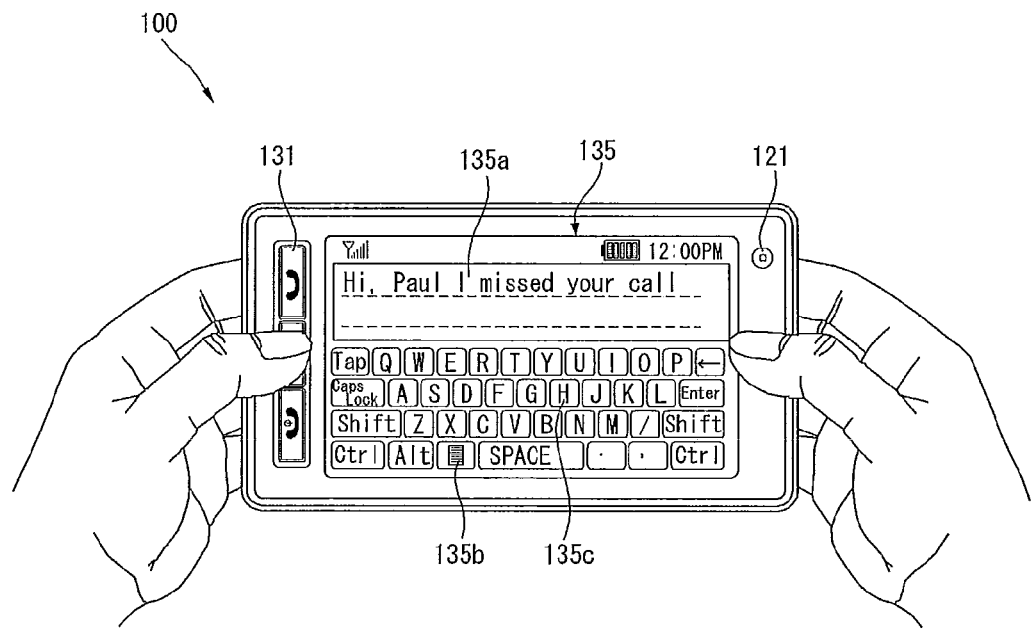

In more detail, FIGS. 3A and 3B are front views of the handheld terminal 100 for explaining an operating state of the handheld terminal according to an embodiment of the present invention. In addition, the display unit 151 can display various types of visual information in the form of characters, numerals, symbols, graphic or icons. To input the information, at least one of the characters, numerals, symbols, graphic and icons are displayed in predetermined arrangement in the form of a keypad. This keypad can be referred to as a 'soft key' key pad.

Further, FIG. 3A shows that touch applied to a soft key is input through the front side of the terminal body. The display unit 151 can also be operated through the overall area. Otherwise, the display unit 151 can be divided into a plurality of regions and operated. In the latter instance, the display unit 151 can be constructed such that the plurality of regions interoperate. For example, an output window 151a and an input window 151b are respectively displayed in upper and lower parts of the display unit 151. The input window 151b displays soft keys 151c that represent numerals used to input numbers such as telephone numbers. When a soft key 151c is touched, a numeral corresponding to the touched soft key is displayed on the output window 151a. When the user operates a first operating unit 116, the controller 180 attempts to connect a call corresponding to a telephone number displayed on the output window 151a.

Next, FIG. 3B shows that touch applied to soft keys is input through the rear side of the terminal body. FIG. 3B also shows the landscape of the terminal body, while FIG. 3A shows the portrait of the terminal body. That is, the display unit 151 can be constructed such that an output image is converted according to the direction in which the terminal body is located. Further, FIG. 3B shows the operation of the handheld terminal in a text input mode. As shown, the display unit 151 displays an output window 135a and an input window 135b. A plurality of soft keys 135c indicating at least one of characters, symbols and numerals are arranged in the input window 135b. The soft keys 135c can also be arranged in the form of QWERTY keys.

When the soft keys 135c are touched through the touch pad 135, characters, numerals and symbols corresponding to the touched soft keys 135c are displayed on the output window 135a. Touch input through the touch pad 135 can prevent the soft keys 135c from being covered with the user's fingers when the soft keys 135c are touched as compared to touch input through the display unit 151. When the display unit 151 and the touch pad 135 are transparent, fingers located behind the terminal body can be seen by the user, and thus touch input can be performed more accurately.

In addition, the display unit 151 or the touch pad 135 can be constructed such that it receives touch input in a scroll manner. That is, the user can scroll the display unit 151 or the touch pad 135 to move an object displayed on the display unit 151, for example, a cursor or a pointer located on an icon. Furthermore, when the user moves his or her finger on the display unit 151 or the touch pad 135, the finger moving path can be visually displayed on the display unit 151. This will be useful to edit an image displayed on the display unit 151.

Also, when the display unit 151 (touch screen) and the touch pad 135 are simultaneously touched in a predetermined period of time, a specific function of the terminal can be executed. This action can include when the user clamps the terminal body using the thumb and the index finger. The specific function can include activation or inactivation of the display unit 151 or the touch pad 135, for example.

Figure 4:
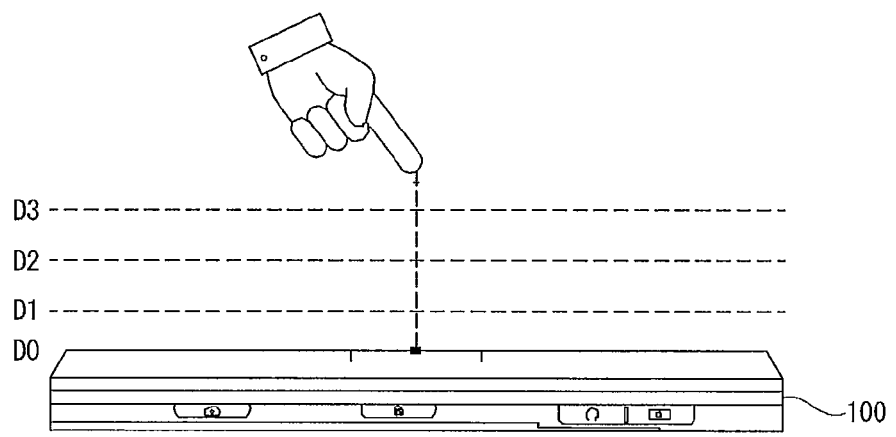
FIG. 4 is a conceptional view for explaining a proximity depth of a proximity sensor.

The proximity sensor 141 described with reference to FIG. 1 will now be explained in more detail with reference to FIG. 4. That is, FIG. 4 is a conceptional view for explaining a proximity depth of the proximity sensor 141. As shown in FIG. 4, when a pointer such as a user's finger approaches the touch screen, the proximity sensor 141 located inside or near the touch screen senses the approach and outputs a proximity signal. In addition, the proximity sensor 141 can be constructed such that it outputs a proximity signal according to the distance between the pointer approaching the touch screen and the touch screen (referred to as "proximity depth"). The distance in which the proximity signal is output when the pointer approaches the touch screen is referred to as a detection distance. The proximity depth can be known by using a plurality of proximity sensors having different detection distances and comparing proximity signals respectively output from the proximity sensors.

Further, FIG. 4 shows the section of the touch screen in which proximity sensors capable of sensing three proximity depths are arranged. Proximity sensors capable of sensing less than three or more than four proximity depths can be arranged in the touch screen. Specifically, when the pointer completely comes into contact with the touch screen (D0), it is recognized as contact touch. When the pointer is located within a distance D1 from the touch screen, it is recognized as proximity touch of a first proximity depth, and when the pointer is located in a range between the distance D1 and a distance D2 from the touch screen, it is recognized as proximity touch of a second proximity depth. Further, when the pointer is located in a range between the distance D2 and a distance D3 from the touch screen, it is recognized as proximity touch of a third proximity depth, and when the pointer is located at longer than the distance D3 from the touch screen, it is recognized as cancellation of the proximity touch.

Accordingly, the controller 180 can recognize the proximity touch as various input signals according to the proximity distance and proximity position of the pointer with respect to the touch screen and perform various operation controls according to the input signals.

Embodiments of the present invention will now be explained in more detail. The embodiments also refer to the display unit 151 as a touch screen. A touch also includes both a proximity touch and a direct touch in the following description. Furthermore, touch input includes every possible touch according to variations in the number of touches, duration, behavior and form of a touch, such as various input signals corresponding to touch variations, for example, touch down, touch up, a lapse of predetermined touch duration, drag and drop, etc.

In the following embodiments of the present invention, the above-described touch sensor for sensing a contact touch and/or the proximity sensor for sensing a proximity touch are located in the position of each of the input/output units such as the camera 121, and the microphone 122 of the A/V input unit 120, and/or the display unit 151 and the audio output module 152 of the output unit 150 and/or in the neighborhood of the input/output unit, which is close enough to designate the input/output unit according to experiments or experiences.

First Embodiment

A method of controlling an input/output of information according to a touch of an input/output unit of a mobile terminal according to a first embodiment of the present invention will now be explained. According to the first embodiment of the present invention, an input/output of the input/output unit is controlled according to a contact touch generated by directly touching the input/output unit or the neighborhood area (which includes the position of the input/output unit hereinafter) of the input/output unit in various manners.

That is, according to the method of controlling input/output of information with a touch of the input/output unit of the mobile terminal in accordance with the first embodiment of the present invention, the controller 180 controls the input/output unit when a user touches the neighborhood of the input/output unit in a specific manner. In more detail, FIGS. 5-10 are overviews of display screens illustrating examples of various touch input methods which can be performed to control an input/output of information through a touch of an input/output unit. Further, control commands respectively corresponding to the touch input methods are previously set, and thus the controller 180 can confirm a control command corresponding to a specific touch input method and control the input/output unit according to the control command.

Specifically, a user touches the input/output unit or the neighborhood area of the input/output unit in a predetermined manner such that the sensing unit 140 illustrated in FIG. 1 can sense the touching operation. Then, the sensing unit 140 senses the touching operation, generates a detection signal according to the sensing result and applies the detection signal to the controller 180. The controller 180 then receives the detection signal from the sensing unit 140 according to the touching operation, analyzes the detection signal to detect the input/output unit to be controlled, which corresponds to the detection signal, and a predetermined control command corresponding to the detection signal and controls the input/output unit according to the control command.

Figure 5:
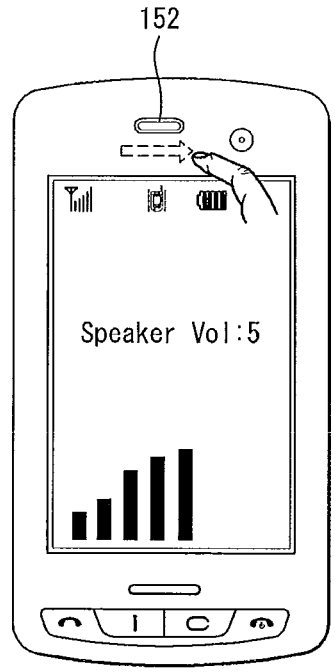
FIGS. 5-10 are overviews of display screens for explaining an input/output controlling method of a mobile terminal according to a first embodiment of the present invention.

In the example illustrated in FIG. 5, the input/output unit is controlled according to a dragging operation in a specific direction in the neighborhood of the input/output unit. Referring to FIG. 5, when the user touches the audio output module 152 among the input/output units of the mobile terminal or the neighborhood area of the audio output module 152 through a specific operation, for example, an operation of dragging his or her finger from left to right, the sensing unit 140 senses the touch of the user and applies a predetermined detection signal corresponding to the touch to the controller 180.

The controller 180 receives the detection signal corresponding to the touch on the audio output module 152 from the sensing unit 140, recognizes that the detection signal relates to the audio output module 152 and the dragging operation from left to right corresponds to a control command "volume-up", and controls the audio output module 152 according to the control command to increase the volume of the audio output module 152. On the contrary, when the sensing unit 140 senses a drag of the user's finger from right to left on the audio output module 152 and applies a detection signal corresponding to the sensed drag to the controller 180, the controller 180 can decrease the volume of the audio output module 152 according to the detection signal.

Figure 6:
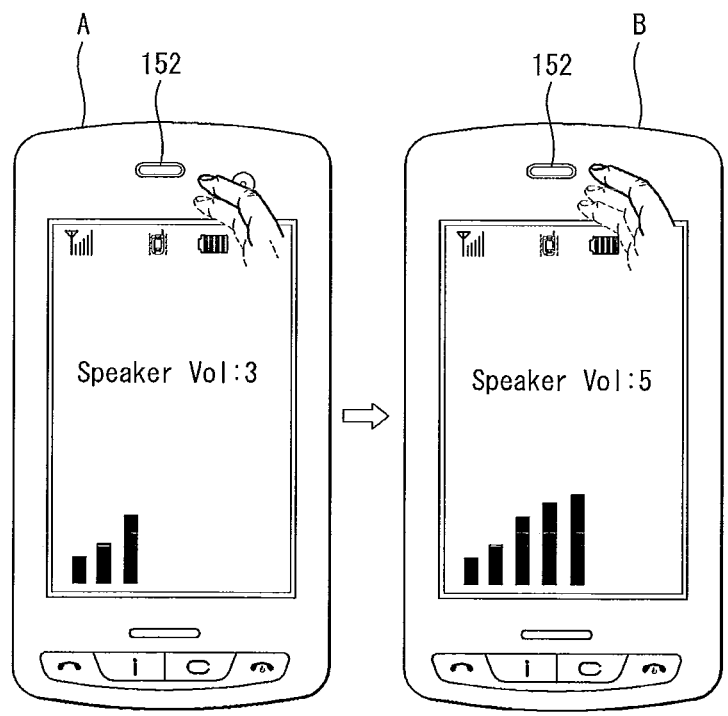

In the example illustrated in FIG. 6, the input/output unit is controlled according to the number of times of touching the neighborhood area of the input/output unit. Referring to FIG. 6, as the number of times of touching the audio output module 152 by the user increases, the controller 180 increases the volume of the audio output module 152 by a predetermined level whenever the user touches the audio output module 152 once, for example. That is, the controller 180 can control the output level of the input/output unit, such as the volume or brightness of the input/output unit, to be gradually increased as the neighborhood area of the input/output unit is repeatedly touched.

Figure 7:
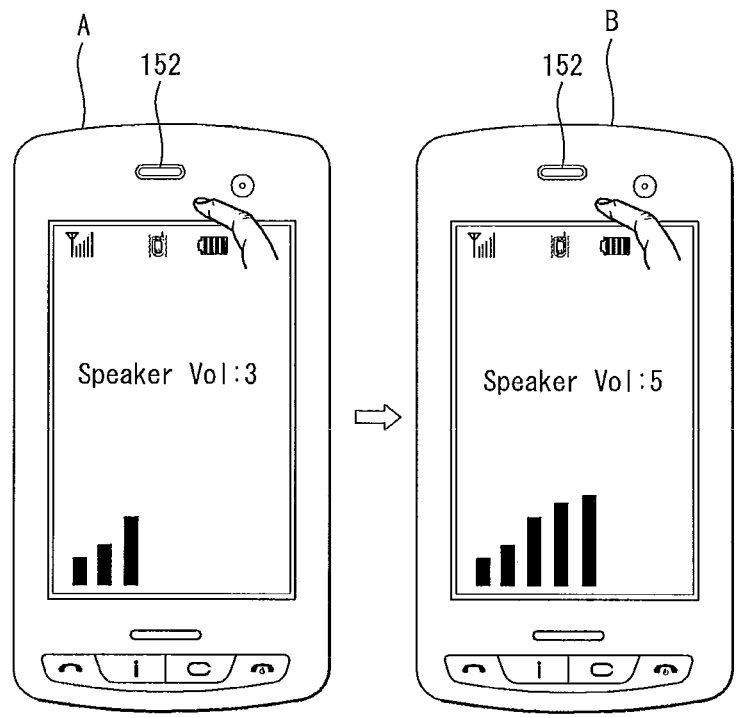

In the example illustrated in FIG. 7, the input/output unit is controlled according to the duration of a touch on the neighborhood area of the input/output unit. Referring to FIG. 7, when the user touches the neighborhood area of the audio output module 152 for a long time to continue the touch, the controller 180 gradually increases the volume of the audio output module 152 for the duration of the touch.

Figure 8:
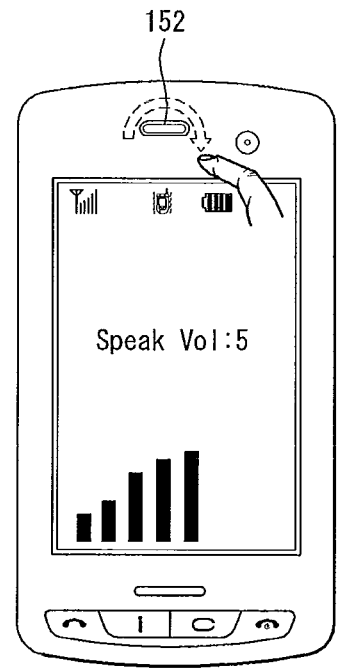

In the example illustrated in FIG. 8, the input/output unit is controlled in such a manner that the user drags his or her finger in a specific manner in close proximity to the input/output unit. Referring to FIG. 8, when the user drags his or her finger clockwise, for example, in close proximity to the audio output module 152, the controller 180 can gradually increase the volume of the audio output module 152. On the contrary, the controller 180 can gradually decrease the volume of the audio output module 152 when the user drags his or her finger counterclockwise.

Figure 9:
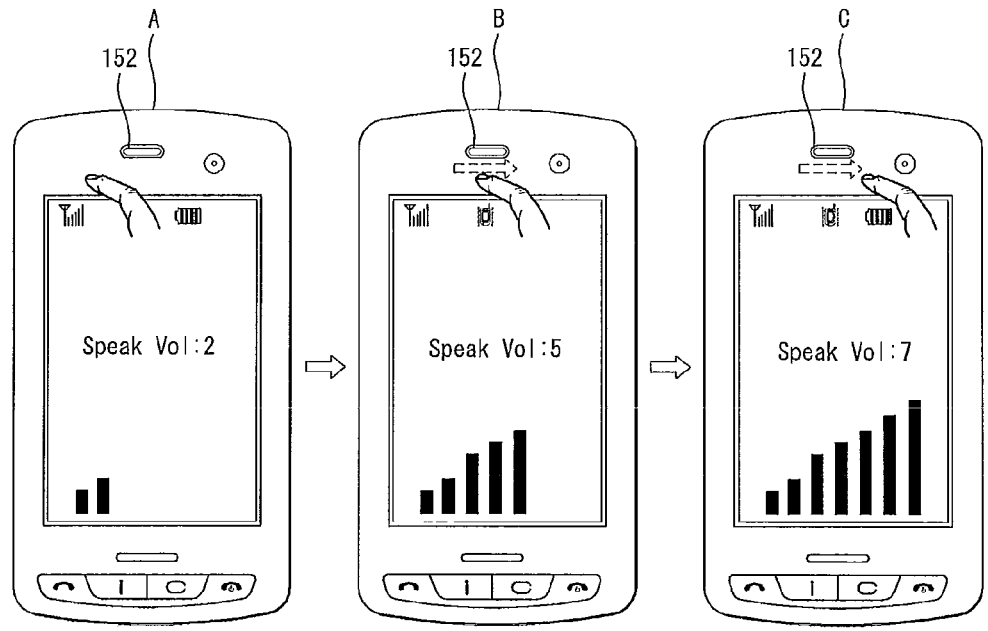

FIG. 9 illustrates the example of the first embodiment of the present invention, which is described with reference to FIG. 5, in more detail. Referring to FIG. 9, the user drags his or her finger from left to right on the audio output module 152 among the input/output units of the mobile terminal or in close proximity to the audio output module 152. Then, the volume of the audio output module 152 gradually increases as the dragging operation is performed, which is illustrated by left, middle and right images A, B and C of FIG. 9. That is, the controller 180 can control the output level of the input/output unit, such as the volume of the audio output module 152, to be gradually increased according to the duration of a finger-dragging operation performed on the audio output module 152 or a degree to which the finger-dragging operation is performed.

Figure 10:
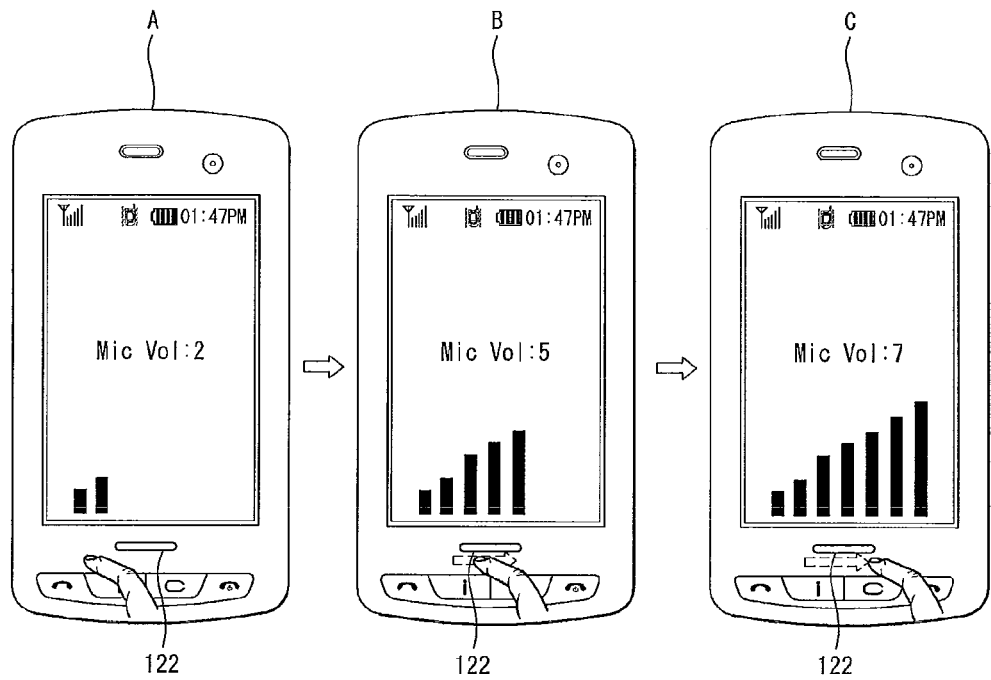

Next, FIG. 10 illustrates the example of the first embodiment of the present invention being applied to the microphone 122. Referring to FIG. 10, the user drags his or her finger from left to right on the microphone 122 among the input/output units of the mobile terminal or in close proximity to the microphone 122. Then, the output level of the microphone 122 gradually increases as the dragging operation is performed, which is illustrated by left, middle and right images A, B and C of FIG. 10. That is, the controller 180 can gradually increase the output level of the microphone 122 according to the duration of a finger-dragging operation performed on the microphone 122 or a degree to which the finger-dragging operation is executed.

Second Embodiment

A method of controlling an input/output in the mobile terminal according to a second embodiment of the present invention will now be explained. The second embodiment of the present invention can perform an operation of controlling an input/output of information to/from at least one of at least two input/output units according to touching operations performed on the at least two input/output units.

The method of controlling an input/output of information in the mobile terminal according to the second embodiment of the present invention can include an input/output controlling operation with respect to a device related to at least one of the at least two touched input/output units in addition to the operation of controlling input/output information to/from the at least one of the at least two touched input/output units. When the audio output module 152 and the touch screen 151 are touched, for example, the input/output controlling method according to the second embodiment of the present invention can include an operation of inputting (recording) audio data to (in) the memory 150 as an input/output controlling operation for executing a recording function related to the audio output module 152.

In addition, the order of performing the control operations with respect to the at least two input/output units can be varied according to the order of touching the at least two input/output units. Furthermore, touch inputs applied to the at least two input/output units can be the same touch or different touches in terms of the number of touches, the duration, behavior and form of touches. For example, an input/output unit is touched once, and then another input/output unit is touched once within a predetermined period. Otherwise, an input/output unit is touched, and then a finger-dragging operation is performed on another input/output unit within a predetermined period.

Examples of controlling an input/output of information to/from the mobile terminal according to a combination of a touch of an input/output unit or the neighborhood of the input/output unit and a touch of another input/output unit, for example, the touch screen 151, will now be explained. That is, in the method of controlling an input/output of information to/from input/output units of the mobile terminal according to the second embodiment of the present invention, a user can touch the neighborhood of a specific input/output unit and drag the touch to the inside of the touch screen 151 while maintaining the touch or touch the touch screen 151 and drag the touch to the neighborhood of the specific input/output unit. Then, the controller 180 controls a corresponding input/output unit in a predetermined manner corresponding to the aforementioned touch input.

In more detail, FIGS. 11-14 are overviews of display screens illustrating examples of controlling various input/output units of the mobile terminal according to the second embodiment of the present invention. To perform the aforementioned touch input method, a touch sensor or a proximity sensor is attached to each input/output unit or the neighborhood area of each input/output unit, as described above. While the touch sensor or the proximity sensor can have a sufficient size such that the touch sensor or the proximity sensor comes in contact with the boundary of the touch screen 151, the size of the touch sensor or the proximity sensor is not limited thereto and the touch sensor or the proximity sensor can be located apart from the boundary of the touch screen 151.

In addition, the controller 180 combines a detection signal received from the sensing unit 140 including the touch sensor or the proximity sensor located in close proximity to an input/output unit and a detection signal received from the touch screen 151 to detect a predetermined control command corresponding to the combined detection signal. In this instance, the controller 180 checks the temporal sequence of the detection signal corresponding to touch input applied to the neighborhood of the input/output unit and the detection signal corresponding to touch input applied to the touch screen 151, the interval of the touch inputs, and the forms of the touch inputs and executes the predetermined control command.

For example, when the neighborhood of the input/output unit is touched and then the touch screen 151 is touched within a predetermined period, the controller 180 determines that this touch behavior corresponds to a control command with respect to the input/output unit and combines the forms of the two touch inputs to detect the type of the control command.

Figure 11:
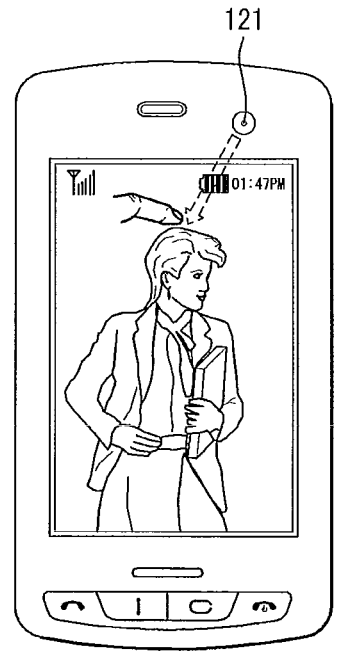
FIGS. 11-19 are overviews of display screens for explaining an input/output controlling method of a mobile terminal according to a second embodiment of the present invention.

Referring to FIG. 11, the user touches the camera 121 among the input/output units of the mobile terminal or the neighborhood area of the camera 121 and drags the touch to the inside of the touch screen 151. In this instance, a detection signal corresponding to the touch input applied to the camera 121 is input to the controller 180, and then a detection signal corresponding to the dragging operation performed on the touch screen 151 is applied to the controller 180 within a predetermined period. The dragging operation performed on the touch screen 151 has directivity from a side of the touch screen 151, which corresponds to the camera 121, to the center of the touch screen 151.

Accordingly, the controller 180 can determine that the aforementioned touch input operation corresponds to a control command with respect to the camera 121. For example, if the aforementioned touch input operation corresponds to an ON command that starts the function of the camera 121, the controller 180 controls the camera 121 to activate the function of the camera 121 according to combination of the detection signals obtained from the touch input operation.

Figure 12:
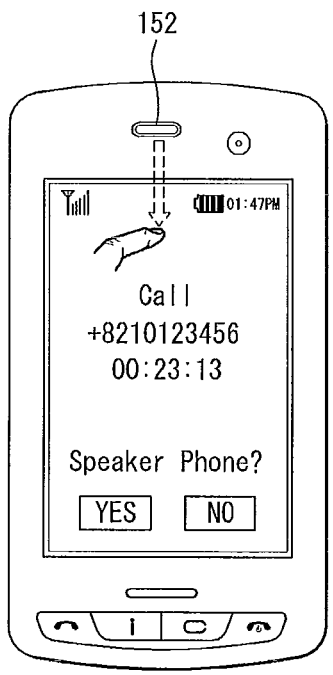

Referring to FIG. 12, when the audio output module 152 is touched and the touch is dragged to the touch screen 151, the controller 180 receives a detection signal corresponding to touch input applied to the audio output module 152. Furthermore, the controller 180 receives another detection signal through the touch screen 151 within a predetermined period from when the detection signal corresponding to the touch input applied to the audio output module 152 is input to the controller 180. The second detection signal has directivity from a side of the touch screen 151, which faces the audio output module 152, to the center of the touch screen 151.

The controller 180 then executes a predetermined control command according to combination of the two detection signals. When the two detection signals are generated and applied to the controller 180 while the mobile terminal executes a specific function, the controller 180 can execute a control command related to the specific function. For example, when the aforementioned touch input operation is performed and the two detection signals are successively input to the controller 180 while the voice call function of the mobile terminal is performed, the controller 180 can control the audio output module 152 to execute a speaker phone function.

Figure 13:
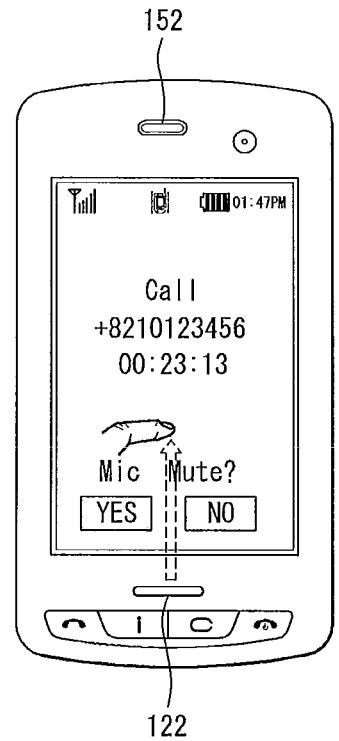

Referring to FIG. 13, the microphone 122 is touched and then the touch is dragged to the touch screen 151 while the voice call function is performed. The controller 180 controls an output of the microphone 122 with respect to the voice call function according to the combination of detection signals corresponding to the touching and dragging operations. For example, the controller 180 can control the output level of the microphone 122 to become '0' while the voice call function is executed to prevent the user's voice from being input and delivered to a counterpart.

Figure 14:
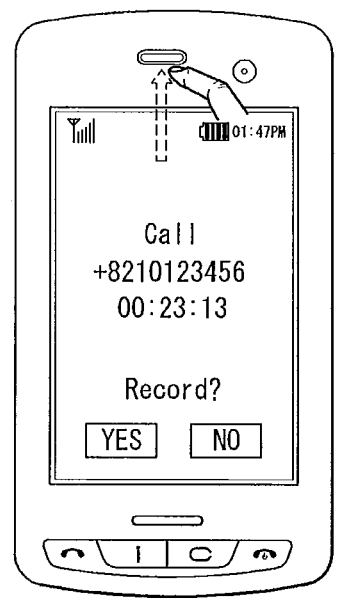

Referring to FIG. 14, the touch screen 151 is touched and the touch is dragged to the audio output module 152 or the neighborhood area of the audio output module 152 while the voice call function is performed. When detection signals corresponding to the touching and dragging operations are applied to the controller 180, the controller 180 executes a predetermined function, that is, a control command with respect to the voice call function, which corresponds to the combination of the detection signals because a control command with respect to the audio output module 152 is input and the mobile terminal currently receives a voice call. If the predetermined function corresponds to a control command that instructs the contents of the voice call to be recorded, the controller 180 controls the audio output module 152 to record a voice signal output from the audio output module 152.

Figure 15:
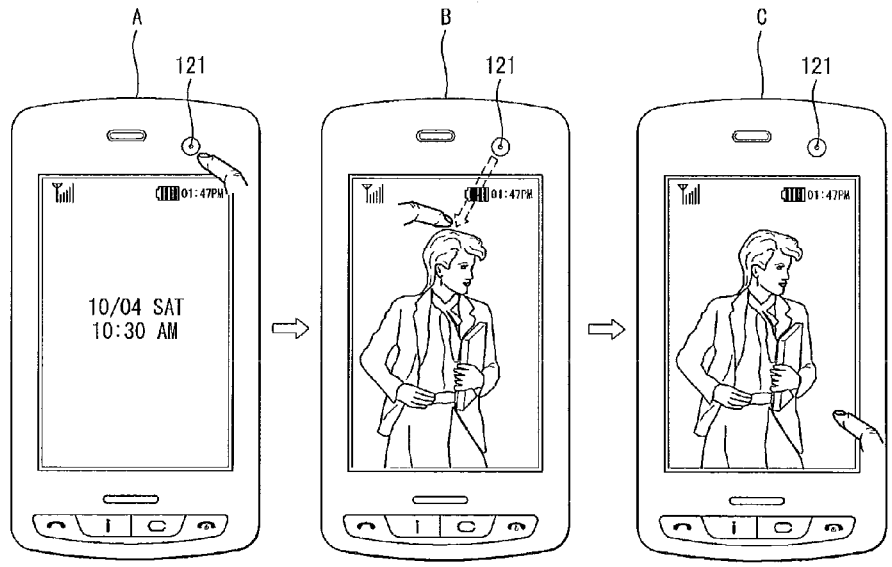

Next, FIG. 15 illustrates the example of the second embodiment of the present invention, which was described with reference to FIG. 11, in more detail. Referring to FIG. 15, the user touches the camera 121 among the input/output units of the mobile terminal or the neighborhood area of the camera 121 and drags the touch to the inside of the touch screen 151. The controller 180 then activates the function of the camera 121 according to sequentially generated two inputs, that is, the touch input applied to the camera 121 and the drag to the touch screen 151. When the camera 121 is activated, an image of an object is displayed on the touch screen 151, as illustrated in the center image B of FIG. 15. When a desirable image of the object is displayed, the user can capture the image in a manner of touching the touch screen 151, as illustrated in the right image C of FIG. 15.

Figure 16:
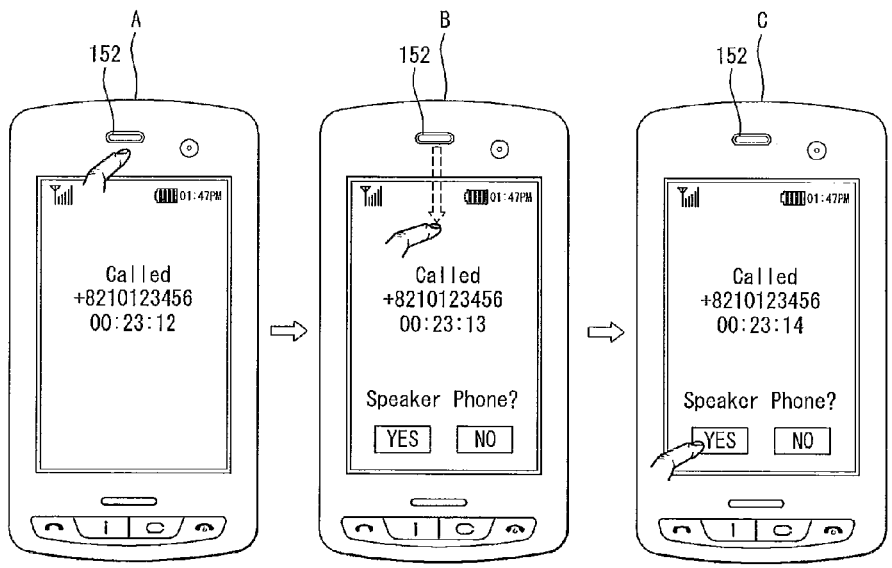

FIG. 16 illustrates the example of the second embodiment of the present invention, which was described with reference to FIG. 12, in more detail. Referring to FIG. 16, the user touches the audio output module 152 among the input/output units of the mobile terminal or the neighborhood area of the audio output module 152 and drags the touch to the inside of the touch screen 151. In this instance, the controller 180 controls an output of the audio output module 152 according to the sequentially generated two inputs, that is, the touch input applied to the audio output module 152 and the drag to the touch screen 151. If the mobile terminal performs a call function before the user performs the aforementioned input operation, for example, the controller 180 can control the audio output module 152 according to the input operation to change the currently performed call function to a speaker phone mode.

In this instance, while the controller 180 can control the audio output module 152 to change the operating state of the mobile terminal to the speaker phone mode only using the touch input without having an additional operation of confirming the user, the operation of confirming the user can be formed as illustrated in FIG. 16. That is, the controller 180 can display an icon for receiving a user's selection, for example, "yes" and "no", on the touch screen 151 and control the audio output module 152 to inquire the user whether the speaker phone mode is activated, as illustrated in the center image B of FIG. 16. The controller 180 can activate the speaker phone mode when the user selects "yes", as illustrated in the right image C of FIG. 16.

Figure 17:
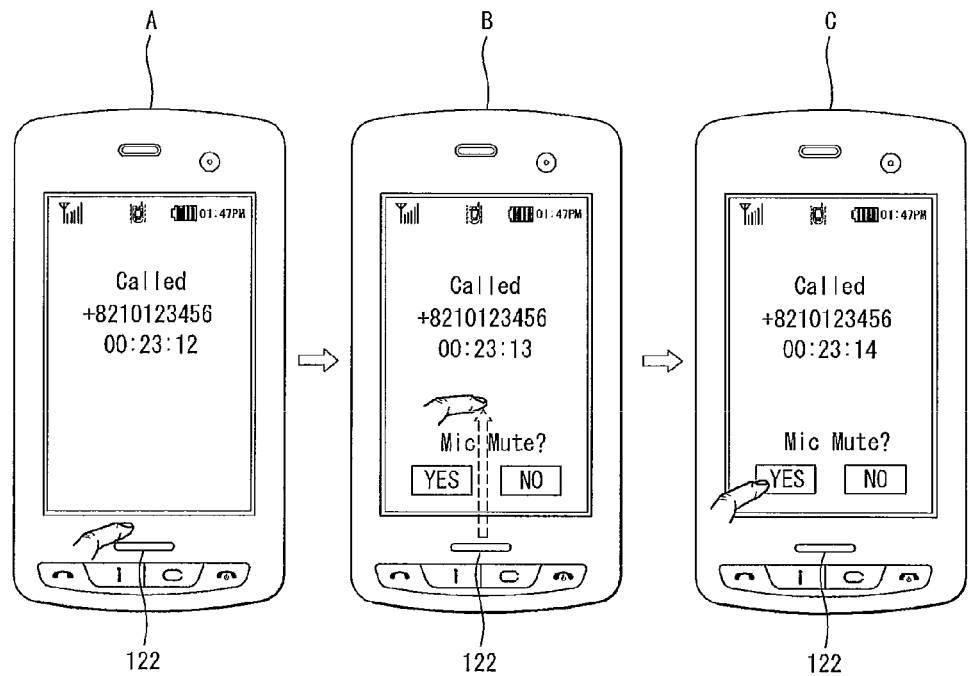

Next, FIG. 17 illustrates the example of the second embodiment of the present invention, which was described with reference to FIG. 13, in more detail. Referring to FIG. 17, the user touches the microphone 122 or the neighborhood area of the microphone 122 and drags the touch to the inside of the touch screen 151 while the voice call function is executed. In this instance, the controller 180 controls an output of the microphone 152 according to the sequentially generated two inputs, that is, the touch input applied to the microphone 122 and the drag to the touch screen 151. That is, the controller 180 controls the output level of the microphone 122 to become '0' so as to prevent the user's voice from being input to the mobile terminal while the voice call function is executed.

Further, while it is possible to control the microphone 122 only using the touch input without having the additional operation of confirming the user to change the operating state of the mobile terminal to a mute mode, the operation of confirming the user can be performed as illustrated in FIG. 17. That is, the icon for receiving a user's selection, for example, "yes" and "no", is displayed as illustrated in the center image B of FIG. 17, and the output level of the microphone 122 is controlled to become '0' when the user select "yes" to activate the mute mode.

Figure 18:
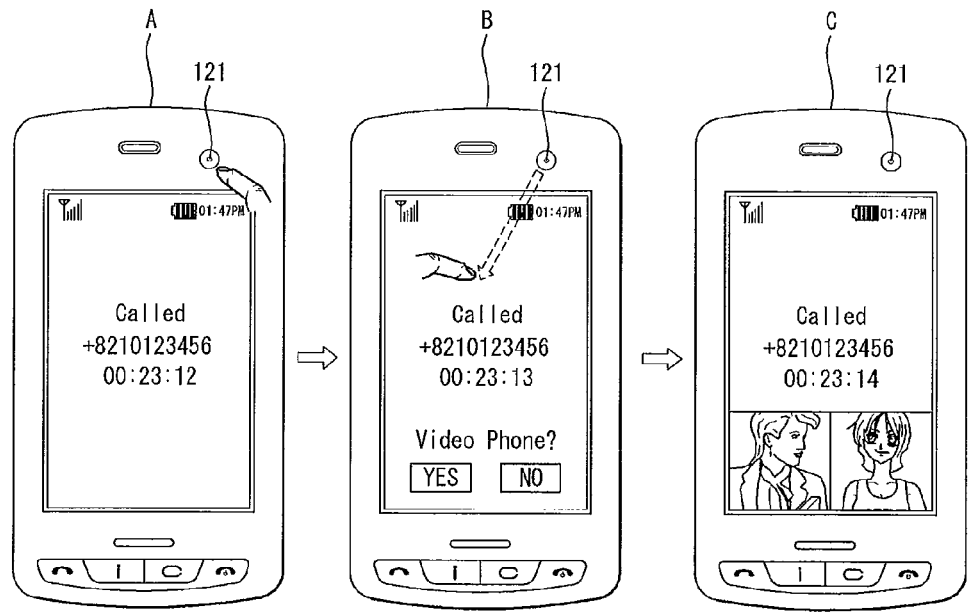

FIG. 18 illustrates an example according to the second embodiment of the present invention. Referring to FIG. 18, the user touches the camera 121 among the input/output units of the mobile terminal or the neighborhood area of the camera 121 and drags the touch to the inside of the touch screen 151. The controller 180 then activates the function of the camera 121 according to the sequentially generated two inputs, that is, the touch input applied to the camera 121 and the drag to the touch screen 151, and the current operating state of the mobile terminal.

If the mobile terminal executes the voice call function before the user performs the aforementioned input operation, the controller 180 can control the camera 121 according to the aforementioned input operation to change the current operating state of the mobile terminal to a video phone mode. Further, while the controller 180 can control the camera 121 only using the touch input without having the additional operation of confirming the user to change the operating state of the mobile terminal to the speaker phone mode, the controller 180 can perform the operation of confirming the user as illustrated in FIG. 18. That is, the icon for receiving a user's selection item is displayed on the touch screen 151, as illustrated in the center image B of FIG. 18, and the video phone function is activated according to a selective touch input of the user as illustrated in the right image of FIG. 18.

Figure 19:
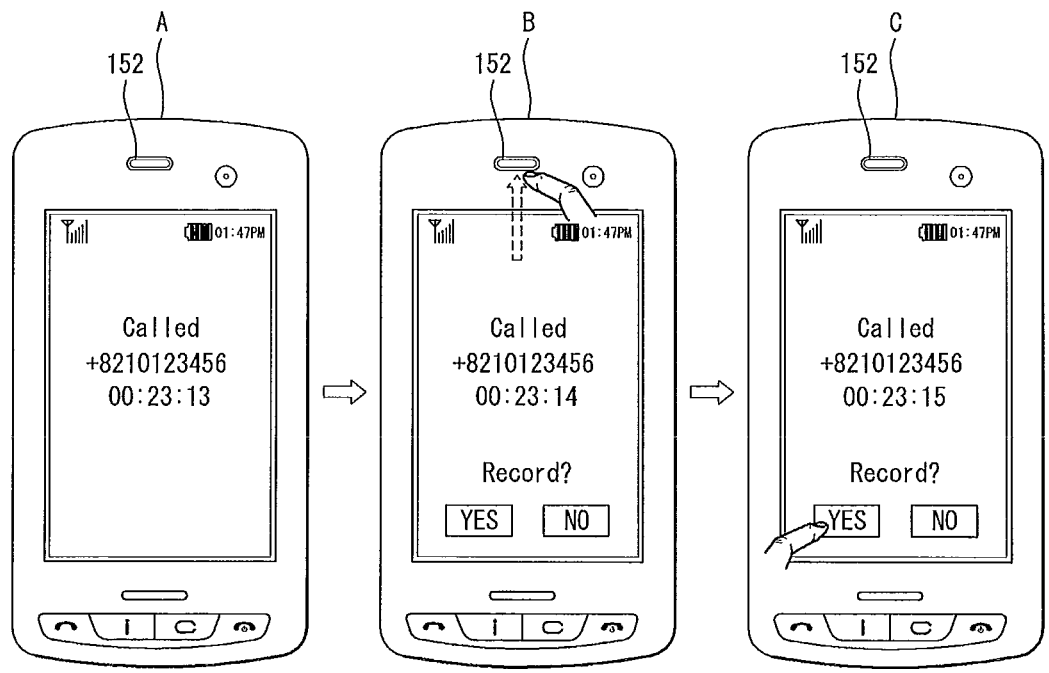

FIG. 19 illustrates the example of the second embodiment of the present invention, which was described with reference to FIG. 14, in more detail. Referring to FIG. 19, the user touches a specific point of the touch screen 151 and drags the touch to the audio output module 152 or the neighborhood area of the audio output module 152 while the voice call function is executed. In this instance, the controller 180 controls the audio output module 152 and/or a predetermined component of the mobile terminal to perform a predetermined function according to the current operating state of the mobile terminal in addition to the two inputs, that is, the touch input applied to the touch screen 151 and the drag to the audio output module 152. Here, the predetermined function can be set to a function performed by the audio output module 152, for example, in advance.

For example, the controller 180 can execute a function of recording the contents of a current call according to the touch input in the operating state of the mobile terminal. Accordingly, the controller 180 can control the memory 160 to record the contents of the call. Here, while the controller 180 can execute the recording function only using the touch input without performing the operation of confirming the user, the operation of confirming the user can be performed as illustrated in FIG. 19.

Third Embodiment

According to a third embodiment of the present invention, an input/output of information to/from the mobile terminal can be controlled according to a proximity touch in addition to a contact touch on an input/output unit of the mobile terminal. To achieve this, the proximity sensor 141 included in the sensing unit 140 is provided to the position of the input/output unit or the neighborhood area of the input/output unit.

Figure 20:
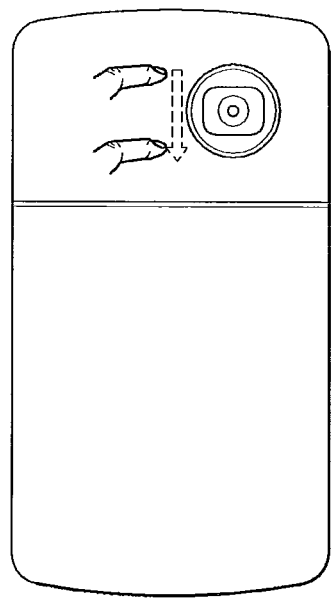
FIGS. 20, 21 and 22 are overviews of display screens for explaining an input/output controlling method of a mobile terminal according to a third embodiment of the present invention.

Referring to FIG. 20, when the user performs a proximity touch operation in such a manner that the user moves his or her finger in close proximity to the mobile terminal or approaches his or her finger to the proximity sensor such that the proximity sensor located at the position of the camera 121' or the neighborhood area of the camera 121' can sense the proximity touch, the sensing unit 140 senses the proximity touch, generates a detection signal corresponding to the proximity touch and applies the detection signal to the controller 180. Then, the controller 180 analyzes the detection signal, confirms that the detection signal correspond to a control command with respect to the camera 121' and controls the camera 121' to perform an operation of capturing a currently input image, for example.

According to the third embodiment of the present invention, the method of controlling the input/output unit, which corresponds to a proximity touch sensed by the proximity sensor, can be set in advance according to various operating states of the mobile terminal. Furthermore, when a proximity touch applied to a specific input/output unit is sensed, it is possible to control a specific input/output unit and another input/output unit related to a specific function together or control the other input/output unit in order to change the current input/output operating state of the mobile terminal or perform the specific function.

Figure 21:
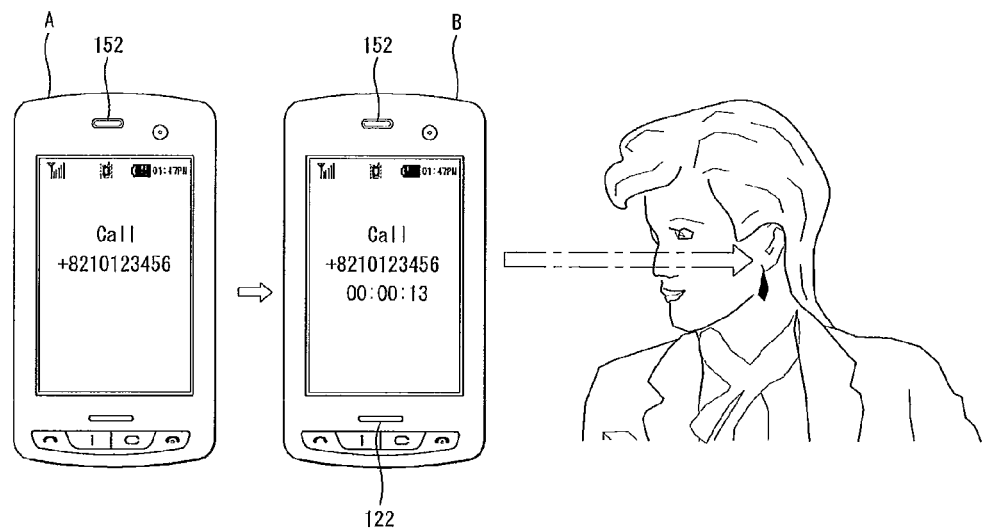

Referring to FIG. 21, when the mobile terminal receives a call, the user approaches his/her face to the neighborhood of the audio output module 152 or the touch screen 151 of the mobile terminal, for example, to receive the call. Then, the sensing unit 140 senses the approach of the user's face to the mobile terminal through the proximity sensor and applies a detection signal corresponding to the approach of the user's face to the controller 180. Accordingly, the controller 180 controls the mobile communication module 112 of the radio communication unit 110 to connect the received call, controls the audio output module 152 to output the voice of a counterpart and controls the microphone 122 to input the user' voice. It is also possible to control the function of a specific input/output unit according to the first embodiment and then control the detailed operation of the input/output unit according to a proximity touch according to the second embodiment or a contact touch according to the first embodiment.

Figure 22:
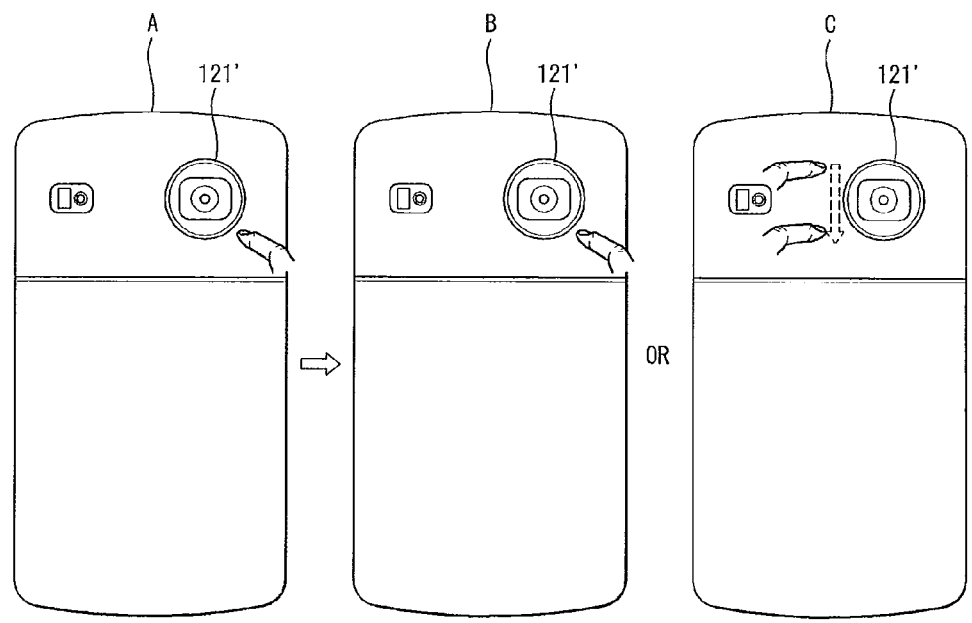

Referring to FIG. 22, the user can contact-touch or proximity-touch the camera 121' or the neighborhood area of the camera 121' to turn on the camera 121' and activate the function of the camera 121', as illustrated in the left image A, and then contact-touch or proximity-touch the camera 121' or the neighborhood area of the camera 121' again, as illustrated in the right images B or C, to capture an image. In particular, when an image is captured according to a proximity touch, image instability according to a touch of the camera 121' or click of a key button can be reduced.

Fourth Embodiment

According to a fourth embodiment of the present invention, the operation of an input/output unit can be controlled and the input/output unit can be used as a display according to a touch input applied to the input/output unit or the neighborhood area of the input/output unit to display the current operating state according to the control of the input/output unit. To achieve this, at least one independently controllable light-emitting device which emits lights in different colors can be provided to the input/output units of the mobile terminal or the neighborhood areas of the input/output units. The light-emitting device includes light-emitting devices such as an LED, OLED and the like.

The controller 180 can independently control the at least one light-emitting device to change the light-emitting area of each light-emitting device or the color of light emitted from each light-emitting device according to an operating state which results from the control of an input/output unit in connection with control of the input/output unit.

Figure 23:
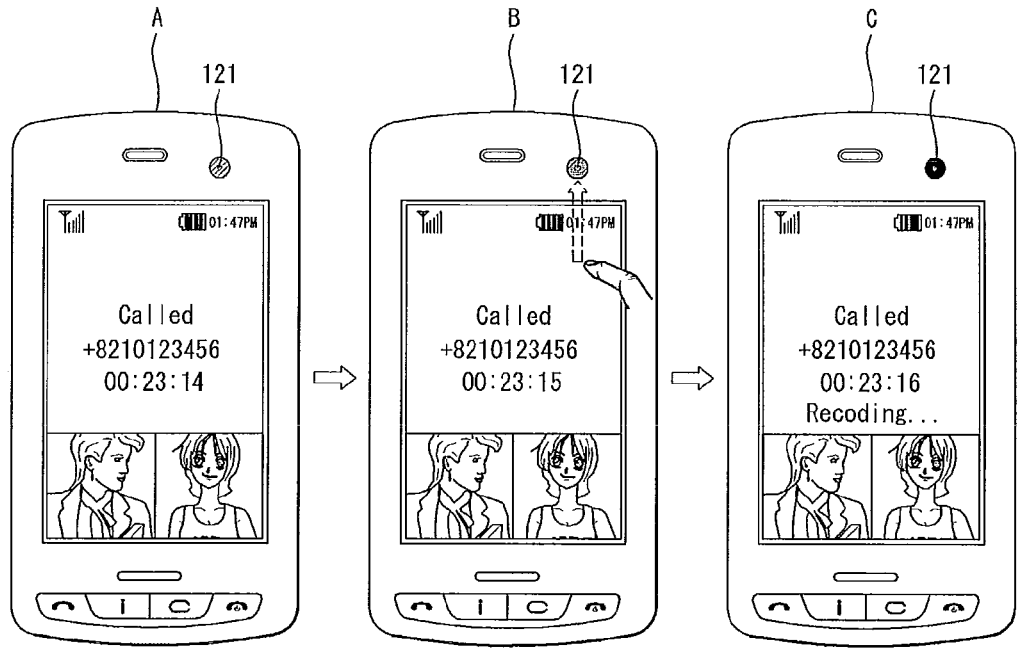
FIGS. 23-28 are overviews of display screens for explaining an input/output controlling method of a mobile terminal according to a fourth embodiment of the present invention.

Referring to FIG. 23, a light-emitting device in a circular or rectangular form, for example, is provided in close proximity to an input/output unit, for example, the camera 121. When a user touches the touch screen 151 and drags the touch to the camera 121 while a video phone call is received, the controller 180 controls the camera 121 and components related to the camera 121, for example, the microphone 122 and the memory 160, to record audio and video contents of the video phone call.

Figure 24:
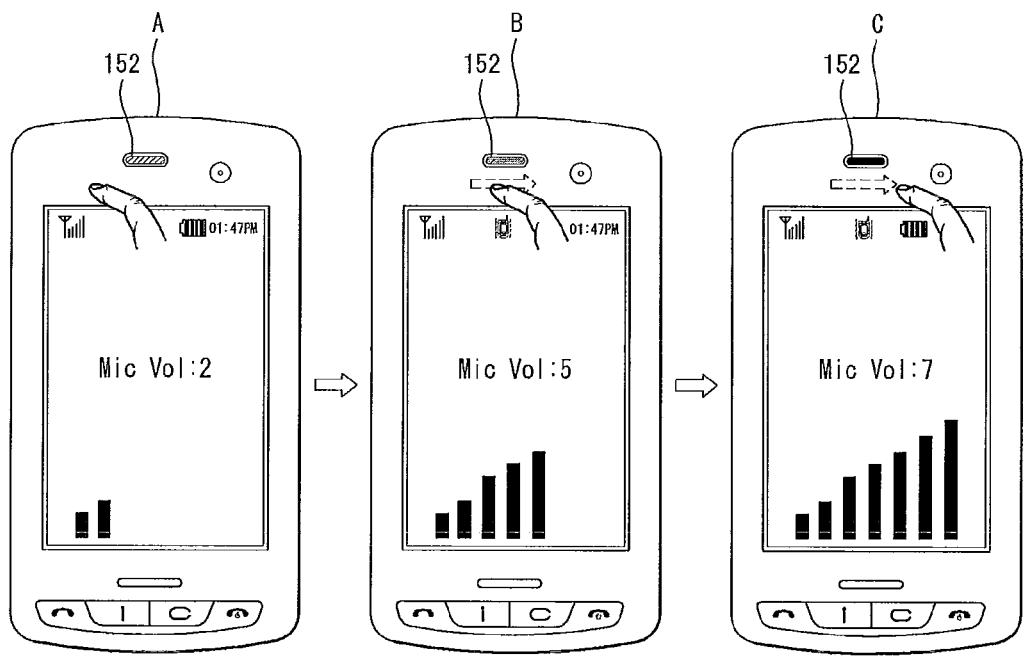

Here, the controller 180 can indicate that the video phone call is being recorded through the touch screen 151, and simultaneously, turn on the light-emitting device provided in close proximity to the camera 121 to emit a red light so as to indicate that the camera 121 is operating. Referring to FIG. 24, a color-variable light-emitting device or a plurality of light-emitting devices which respectively emit light in different colors can be provided to the back of an input/output unit, for example, the audio output module 152, that is, the inside of the mobile terminal.

The controller 180 can also respectively control the plurality of light-emitting devices or the color-variable light-emitting device to vary the color of light emitted from the position of the audio output module 152 according to the volume of the audio output module 152. For example, the controller 180 can gradually increase the volume of the audio output module 152 when a touch input such as drag is applied to the neighborhood of the audio output module 152 and gradually change the color of light emitted from the light-emitting device attached to the audio output module 152 from yellow to orange and then red to indicate that the volume of the audio output module 152 gradually increases.

Figure 25:
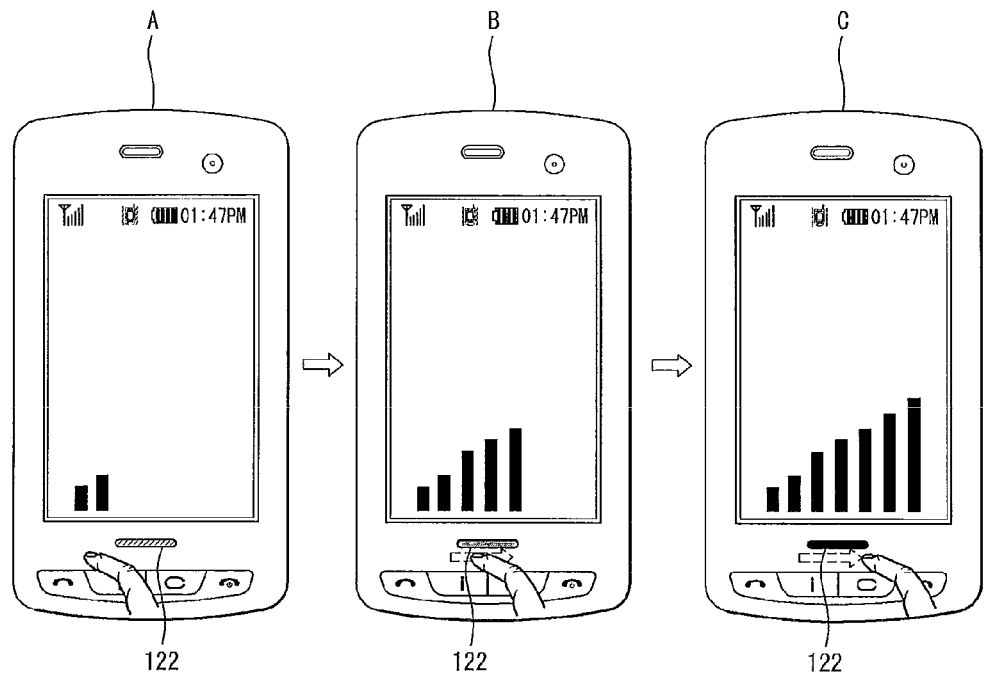

Referring to FIG. 25, a color-variable light-emitting device or a plurality of light-emitting devices which respectively emit lights in different colors can be attached to the back of the microphone 122, which corresponds to the inside of the mobile terminal. The controller 180 can gradually increase the volume of the microphone 122 when a touch input such as drag is app lied to the neighborhood area of the microphone 122 and gradually change the color of light emitted from the light-emitting device attached to the microphone 122 from yellow to orange and then red to indicate that the volume of microphone 122 gradually increases.

Figure 26:
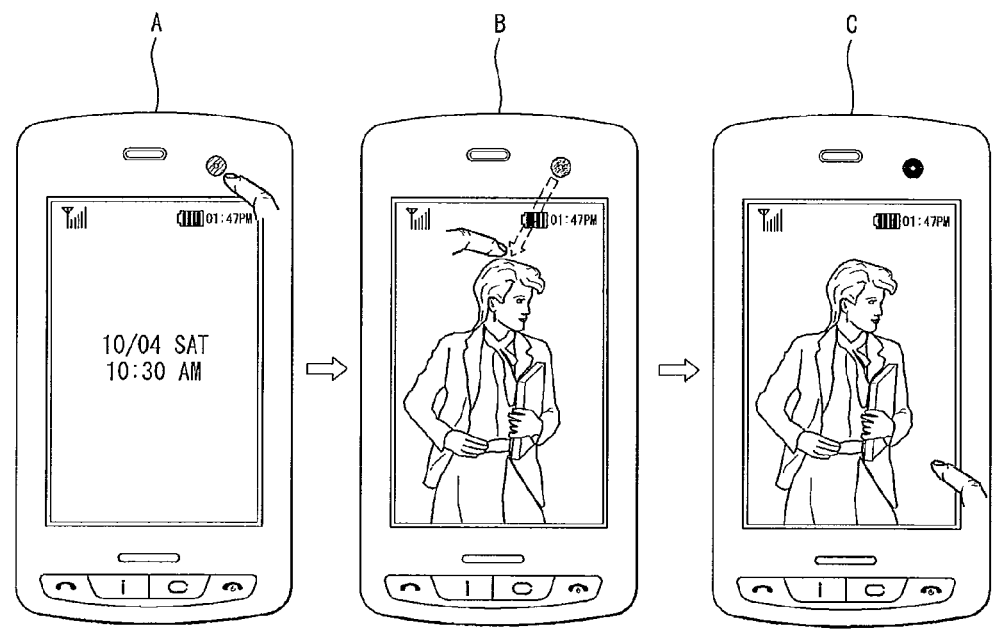

Referring to FIG. 26, a light-emitting device in a circular form, for example, can be attached to the neighborhood area of the camera 121. While the user touches the touch screen 151 and drags the touch to the camera 121 while the video phone call is received in the example illustrated in FIG. 23, the user touches the camera 121 and drags the touch to the touch screen 151 while the mobile terminal is in a standby state in the example illustrated in FIG. 26.

Accordingly, the controller 180 can control the camera 121 to activate the function of the camera 121 so as to photograph a desired object in a manner of touching the screen of the mobile terminal, for example, when the desired object is captured. Furthermore, when the function of the camera 121 is activated, the controller 180 can operate the light-emitting device attached to the neighborhood area of the camera 121 to indicate that the camera 121 is activated and the mobile terminal is in a camera mode.

Figure 27:
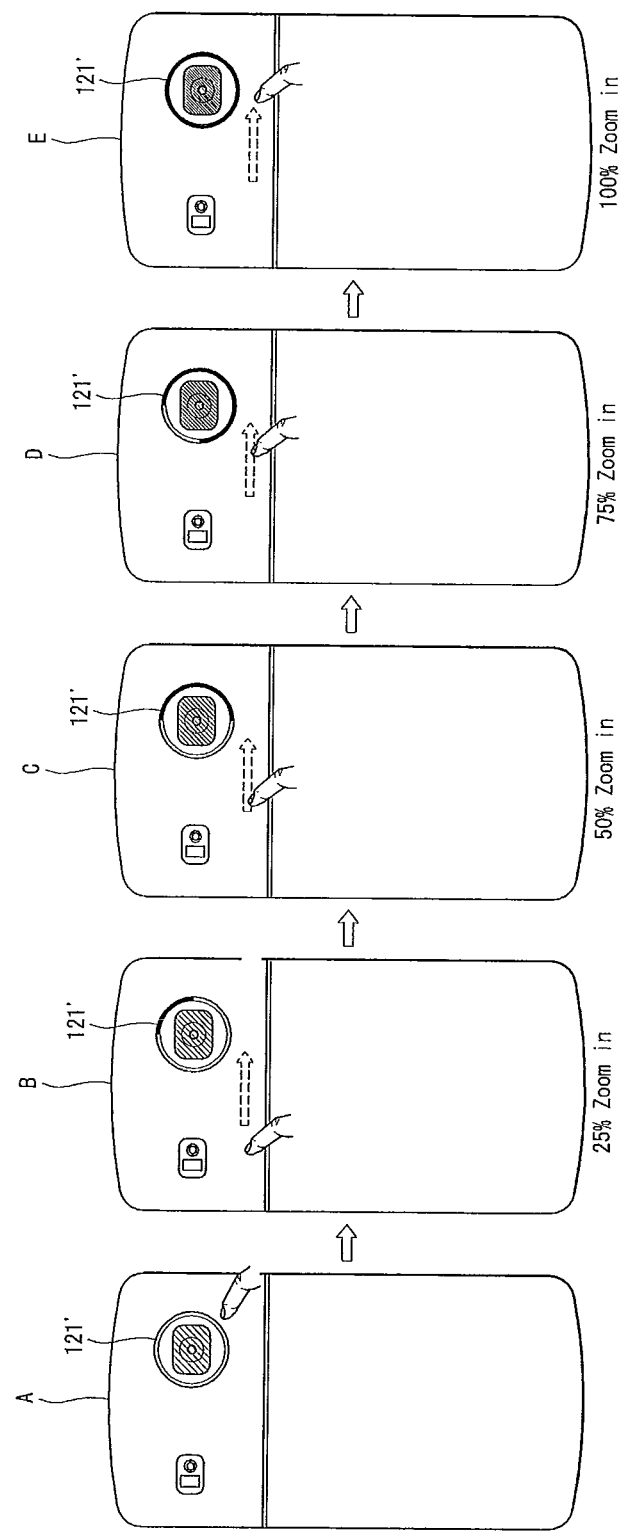

As described above with reference to FIGS. 23 and 26, it is possible to control an input/output unit differently for the same touch input or similar touch inputs according to an operating state or a currently activated function of the mobile terminal. Referring next to FIG. 27, a plurality of independently controllable light-emitting devices are attached to the neighborhood of the camera 121' in a circular form. For example, when the user touches the neighborhood of the camera 121' (A), the controller 180 turns on the camera 121' to activate the function of the camera 121' according to the sensed touch input. Furthermore, the controller 180 turns on the light-emitting devices located around the camera 121' to emit light in a specific color in order to indicate activation of the camera 121'.

Subsequently, when the user drags the touch from left to right while the function of the camera 121' is activated, the controller 180 can vary a level of a zoom-in function of the camera 121' to perform a zoom-in operation in gradually increased magnification. That is, the controller 180 can gradually increase the zoom-in magnification of the camera 121' from 25% to 50% and then 100% according to the dragging operation. Furthermore, the controller 180 can gradually increase the ratio of turned on light-emitting devices to the light-emitting devices located around the camera 121' from ¼ to ½, ¾ and then 4/4 in order to indicate that the zoom-in magnification of the camera 121' is increased while increasing the zoom-in magnification of the camera 121'.

Figure 28:
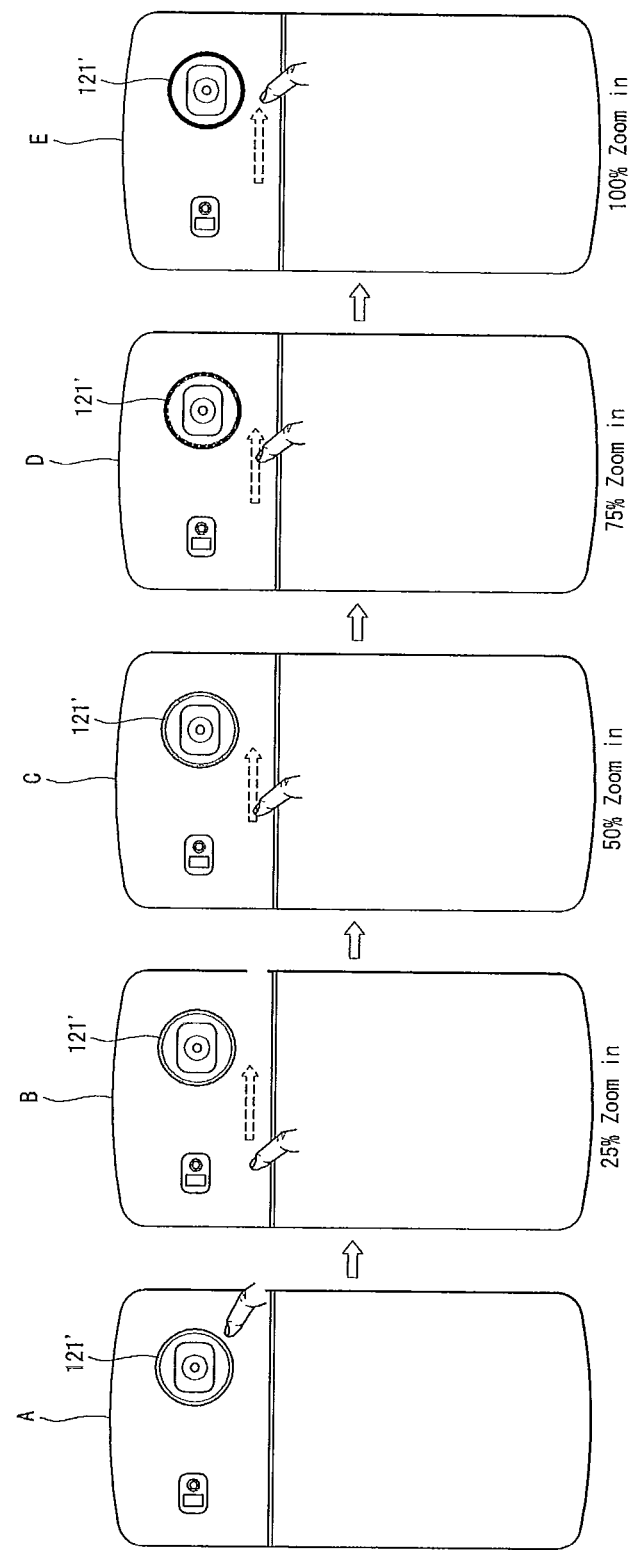

Referring to FIG. 28, a color-variable light-emitting device or a plurality of light-emitting devices emitting light in different colors are provided in a circular form in close proximity to the camera 121'. When the user touches the neighborhood area of the camera 121', for example, the controller 180 turns on the camera 121' according to the sensed touch input to activate the function of the camera 121' and turns on the light-emitting devices provided around the camera 121' to emit light in a specific color in order to indicate activation of the function of the camera 121'.

Subsequently, when the user drags the touch from left to the right while the function of the camera 121' is activated, the controller 180 can change the level of the zoom-in function of the camera 121' to perform the zoom-in function in gradually increased magnification. In addition, the controller 180 can vary the color of light emitted from the light-emitting devices provided around the camera 121' or turn on the light-emitting devices emitting lights in different colors to gradually change the color of lights emitted from the light-emitting devices from yellow to green, blue and then red in order to indicate that the zoom-in magnification of the camera 121' is increased while increasing the zoom-in magnification of the camera 121'.

The above-described method of controlling an input/output of a mobile terminal according to embodiments of the present invention can be written as computer programs in a computer readable recording medium. The method of controlling an input/output of a mobile terminal including a touch screen according to embodiments of the present invention can be executed through software. In this instance, the elements of the present invention are code segments to perform the necessary tasks. The program or code segments can be stored in a processor readable medium or transmitted by a computer data signals embodied in a carrier wave over a transmission medium or communication link.

The computer readable recording medium is any data storage device that can store data which can be thereafter read by a computer system. Examples of the computer readable recording medium include read-only memory (ROM), random-access memory (RAM), CD-ROM, DVD±ROM, DVD-RAM, magnetic tapes, floppy disks, hard disks, and optical data storage devices. The computer readable recording medium can also be distributed over network coupled computer systems so that the computer readable code is stored and executed in a distributed fashion.

Further, the neighborhood area described above refers to an area near or around the particular input/output unit such as the metal or plastic casing used to enclose the particular input/output unit. Further, the neighborhood area includes areas in close proximity to the input/output unit as shown in the Figures.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal, comprising:
a touch-screen display configured to display information;
a speaker configured to output sound data;
a microphone configured to receive voice data;
a mobile communication module configured to perform a calling function with at least one other terminal;
a sensing unit respectively located in a corresponding area of the speaker or the microphone and configured to:
sense a touch and drag operation that starts and ends in the corresponding area of the speaker or the microphone, and
generate a detection signal including a sensing location, a drag direction and a drag distance of the touch and drag operation; and
a controller configured to:
receive the detection signal,
determine a control target and a volume of the control target based on the detection signal,
control a volume of the determined control target to match the determined volume,
determine the speaker as the control target when the sensing location is related to the sensing unit located in the corresponding area of the speaker, and the microphone as the control target when the sensing location is related to the sensing unit located in the corresponding area of the microphone, and
gradually increase and decrease the volume of the control target based on the drag direction and the drag distance,
wherein the speaker, the microphone and the sensing unit are mounted on an area of the mobile terminal that excludes the display,
wherein the volume of the control target is gradually increased or decreased without displaying a user interface on the touch-screen display for inputting commands to gradually increase or decrease the volume,
wherein said display is further configured to display call information related to the calling function, and
wherein the controller is further configured to control the touch-screen display to display a speaker phone function mode allowing a speakerphone mode to be selected on the mobile terminal when another touch and drag operation includes touching the speaker and dragging the touch into an area of the touch-screen display, and to control the touch-screen display to display a microphone mute function mode allowing a microphone mute mode to be selected on the mobile terminal when the another touch and drag operation includes touching the microphone and dragging the touch into the area of the touch-screen display.

2. The mobile terminal of claim 1, wherein the touch and drag operation includes at least one of a contact touch and a proximity touch and drag operation.

3. A mobile terminal, comprising:
a touch-screen display configured to display information;

a speaker configured to output sound data;
a microphone configured to receive voice data;
a mobile communication module configured to perform a calling function with at least one other terminal;
a sensing unit respectively located in a corresponding area of the speaker or the microphone and configured to:
sense a touch and drag operation that starts and ends in the corresponding area of the speaker or the microphone, and
generate a detection signal including a sensing location, a drag direction and a drag distance of the touch and drag operation; and
a controller configured to:
receive the detection signal,
determine a control target and a volume of the control target based on the detection signal,
control a volume of the determined control target to match the determined volume,
determine the speaker as the control target when the sensing location is related to the sensing unit located in the corresponding area of the speaker, and the microphone as the control target when the sensing location is related to the sensing unit located in the corresponding area of the microphone, and
gradually increase and decrease the volume of the control target based on the drag direction and the drag distance,
wherein the speaker, the microphone and the sensing unit are mounted on an area of the mobile terminal that excludes the display,
wherein the volume of the control target is gradually increased or decreased without displaying a user interface on the touch-screen display for inputting commands to gradually increase or decrease the volume,
wherein said display is further configured to display call information related to the calling function, and
wherein the controller is further configured to control the touch-screen display to display a recording function mode allowing a record mode for recording the calling function to be selected on the mobile terminal when another touch and drag operation includes touching the touch-screen display and dragging the touch to the speaker.

4. A mobile terminal, comprising:
a touch-screen display configured to display a preview image;
a camera configured to capture image data;
a sensing unit located in a corresponding area of the camera and configured to:
sense a touch and drag operation that starts in the corresponding area of the camera and ends on the touch-screen display, and
generate a detection signal including a sensing location and a drag direction of the touch and drag operation; and
a controller configured to:
receive the detection signal,
determine a control target and a function of the control target based on the detection signal and a current operating state of the mobile terminal,
control the control target to perform the determined function,
determine the camera as the control target, when the sensing location is related to the sensing unit located in the corresponding area of the camera and the drag direction heads to a center of the touch-screen display,
determine a video phone function as the function of the control target when the current operating state of the mobile terminal is receiving a call, or capturing the preview image on the touch-screen display as the function of the control target when the current operating state of the mobile terminal is not receiving the call,
wherein the camera and the sensing unit are mounted on an area of the mobile terminal that excludes the touch-screen display.

5. The mobile terminal of claim 4, wherein the touch and drag operation includes at least one of a contact touch and a proximity touch.

6. The mobile terminal of claim 5, wherein the controller is further configured to change a zooming function of the camera based another touching action.

7. A method of controlling a mobile terminal, the method comprising:
displaying, via a touch-screen display of the mobile terminal, information;
sensing, via a sensing unit respectively located in a corresponding area of a speaker or a microphone of the mobile terminal, a touch and drag operation that starts and ends in the corresponding area of the speaker or the microphone, and generating a detection signal including a sensing location, a drag direction and a drag distance of the touch and drag operation;
receiving, via a controller of the mobile terminal, the detection signal;
determining, via the controller, a control target and a volume of the control target based on the detection signal;
controlling, via the controller, a volume of the determined control target to match the determined volume;
determining, via the controller, the speaker as the control target when the sensing location is related to the sensing unit located in the corresponding area of the speaker, and the microphone as the control target when the sensing location is related to the sensing unit located in the corresponding area of the microphone; and
gradually increasing and decreasing, via the controller, the volume of the control target based on the drag direction and the drag distance,
wherein the speaker, the microphone and the sensing unit are mounted on an area of the mobile terminal that excludes the display,
wherein the volume of the control target is gradually increased or decreased without displaying a user interface on the touch-screen display for inputting commands to gradually increase or decrease the volume,
wherein the method further comprises:
performing a calling function with at least one other terminal; and
displaying call information related to the calling function, and
wherein the displaying phone function mode allowing a speakerphone mode to be selected on the mobile terminal when another touch and drag operation includes touching the speaker and dragging the touch into an area of the display, and displays a microphone mute function mode allowing a microphone mute mode to be selected on the mobile terminal when the another touch and drag operation includes touching the microphone and dragging the touch into the area of the display.

8. The method of claim 7, wherein the touch and drag operation includes at least one of a contact touch and a proximity touch.

9. A method of controlling a mobile terminal, the method comprising:
displaying, via a touch-screen display of the mobile terminal, information;

sensing, via a sensing unit respectively located in a corresponding area of a speaker or a microphone of the mobile terminal, a touch and drag operation that starts and ends in the corresponding area of the speaker or the microphone, and generating a detection signal including a sensing location, a drag direction and a drag distance of the touch and drag operation;

receiving, via a controller of the mobile terminal, the detection signal;

determining, via the controller, a control target and a volume of the control target based on the detection signal;

controlling, via the controller, a volume of the determined control target to match the determined volume;

determining, via the controller, the speaker as the control target when the sensing location is related to the sensing unit located in the corresponding area of the speaker, and the microphone as the control target when the sensing location is related to the sensing unit located in the corresponding area of the microphone; and gradually increasing and decreasing, via the controller, the volume of the control target based on the drag direction and the drag distance, wherein the speaker, the microphone and the sensing unit are mounted on an area of the mobile terminal that excludes the display, wherein the volume of the control target is gradually increased or decreased without displaying a user interface on the touch-screen display for inputting commands to gradually increase or decrease the volume, wherein the method further comprises:

performing a calling function with at least one other terminal; and displaying call information related to the calling function, and wherein the displaying step displays a recording function mode allowing a record mode for recording the calling function to be selected on the mobile terminal when another touch and drag operation includes touching the display and dragging the touch to the speaker.

10. A method of controlling a mobile terminal, the method comprising:

displaying, via a touch-screen display of the mobile terminal, a preview image;

sensing, via a sensing unit located in a corresponding area of a camera of the mobile terminal, a touch and drag operation that starts in the corresponding area of the camera and ends on the touch-screen display, and generating a detection signal including a sensing location and a drag direction of the touch and drag operation;

receiving, via a controller of the mobile terminal, the detection signal;

deter mining, via the controller, a control target and a function of the control target based on the detection signal and a current operating state of the mobile terminal;

controlling, via the controller, the control target to perform the determined function;

determining, via the controller, the camera as the control target, when the sensing location is related to the sensing unit located in the corresponding area of the camera and the drag direction heads to a center of the touch-screen display; and determining, via the controller, a video phone function as the function of the control target when the current operating state of the mobile terminal is receiving a call, or capturing the preview image on the touch-screen display as the function of the control target when the current operating state of the mobile terminal is not receiving the call, wherein the camera and the sensing unit are mounted on an area of the mobile terminal that excludes the touch-screen display.

11. The method of claim 10, wherein the touch and drag operation includes at least one of a contact touch and a proximity.

* * * * *